US012039631B2

United States Patent
Hayasaka et al.

(10) Patent No.: US 12,039,631 B2
(45) Date of Patent: Jul. 16, 2024

(54) IMAGE PROCESSING APPARATUS, METHOD AND PROGRAM FOR GENERATING VIRTUAL IMAGES WITH AN ABERRATION TABLE

(71) Applicant: Sony Group Corporation, Tokyo (JP)

(72) Inventors: Kengo Hayasaka, Kanagawa (JP); Katsuhisa Ito, Tokyo (JP)

(73) Assignee: Sony Group Corporation, Tokyo (JP)

( * ) Notice: Subject to any disclaimer, the term of this patent is extended or adjusted under 35 U.S.C. 154(b) by 105 days.

(21) Appl. No.: 17/909,607

(22) PCT Filed: Feb. 26, 2021

(86) PCT No.: PCT/JP2021/007357
§ 371 (c)(1),
(2) Date: Sep. 6, 2022

(87) PCT Pub. No.: WO2021/182130
PCT Pub. Date: Sep. 16, 2021

(65) Prior Publication Data
US 2023/0113741 A1    Apr. 13, 2023

(30) Foreign Application Priority Data

Mar. 12, 2020  (JP) .................................. 2020-042830

(51) Int. Cl.
*G06T 11/00*       (2006.01)
*G06F 3/04817*    (2022.01)
(Continued)

(52) U.S. Cl.
CPC .......... *G06T 11/00* (2013.01); *G06F 3/04817* (2013.01); *G06F 3/0482* (2013.01);
(Continued)

(58) Field of Classification Search
CPC ... G06T 11/00; G06T 7/50; G06T 3/40; G06T 2200/24; G06F 3/04817; G06F 3/0482; G06F 3/04847; G06F 3/0486
See application file for complete search history.

(56) References Cited

U.S. PATENT DOCUMENTS

2013/0136342 A1 * 5/2013 Isogai ................. H04N 13/111
                                                    382/154
2013/0322783 A1 * 12/2013 Kang ..................... G06T 11/60
                                                    382/284
(Continued)

FOREIGN PATENT DOCUMENTS

JP          2000341503 A        12/2000
JP          2002196228 A   *     7/2002
(Continued)

OTHER PUBLICATIONS

International Search Report (PCT/ISA/210), International Application No. PCT/JP2021/007357, dated May 25, 2021.

*Primary Examiner* — Terrell M Robinson
(74) *Attorney, Agent, or Firm* — Michael Best & Friedrich LLP

(57) ABSTRACT

The present disclosure relates to an image processing apparatus, an image processing method, and a program for performing lens emulation more easily.
An aberration table is generated as a table including converging ray vectors derived from aberrations of a lens selected through a user interface and targeted for emulation. A light focusing process is performed to generate a virtual captured image taken of an object through the selected lens, by use of the aberration table and a multi-view image. The present disclosure may be applied, for example, to image processing apparatuses, information processing apparatuses, imaging apparatuses, electronic devices, information processing methods, or programs.

18 Claims, 23 Drawing Sheets

(51) Int. Cl.
*G06F 3/0482* (2013.01)
*G06F 3/04847* (2022.01)
*G06F 3/0486* (2013.01)
*G06T 3/40* (2006.01)
*G06T 7/50* (2017.01)

(52) U.S. Cl.
CPC ........ *G06F 3/04847* (2013.01); *G06F 3/0486* (2013.01); *G06T 3/40* (2013.01); *G06T 7/50* (2017.01); *G06T 2200/24* (2013.01)

(56) References Cited

U.S. PATENT DOCUMENTS

| | | | |
|---|---|---|---|
| 2014/0198188 A1* | 7/2014 | Izawa | H04N 13/106 |
| | | | 348/49 |
| 2017/0046821 A1 | 2/2017 | Hayasaka | |
| 2017/0078637 A1* | 3/2017 | Hayasaka | H04N 13/243 |
| 2018/0096487 A1* | 4/2018 | Nash | G06T 7/30 |

FOREIGN PATENT DOCUMENTS

| | | | |
|---|---|---|---|
| JP | 2002196228 A | 7/2002 | |
| JP | 2003524836 A | 8/2003 | |
| JP | 2006060309 A | 3/2006 | |
| WO | 2015037472 A1 | 3/2015 | |
| WO | 2016002578 A1 | 1/2016 | |

\* cited by examiner

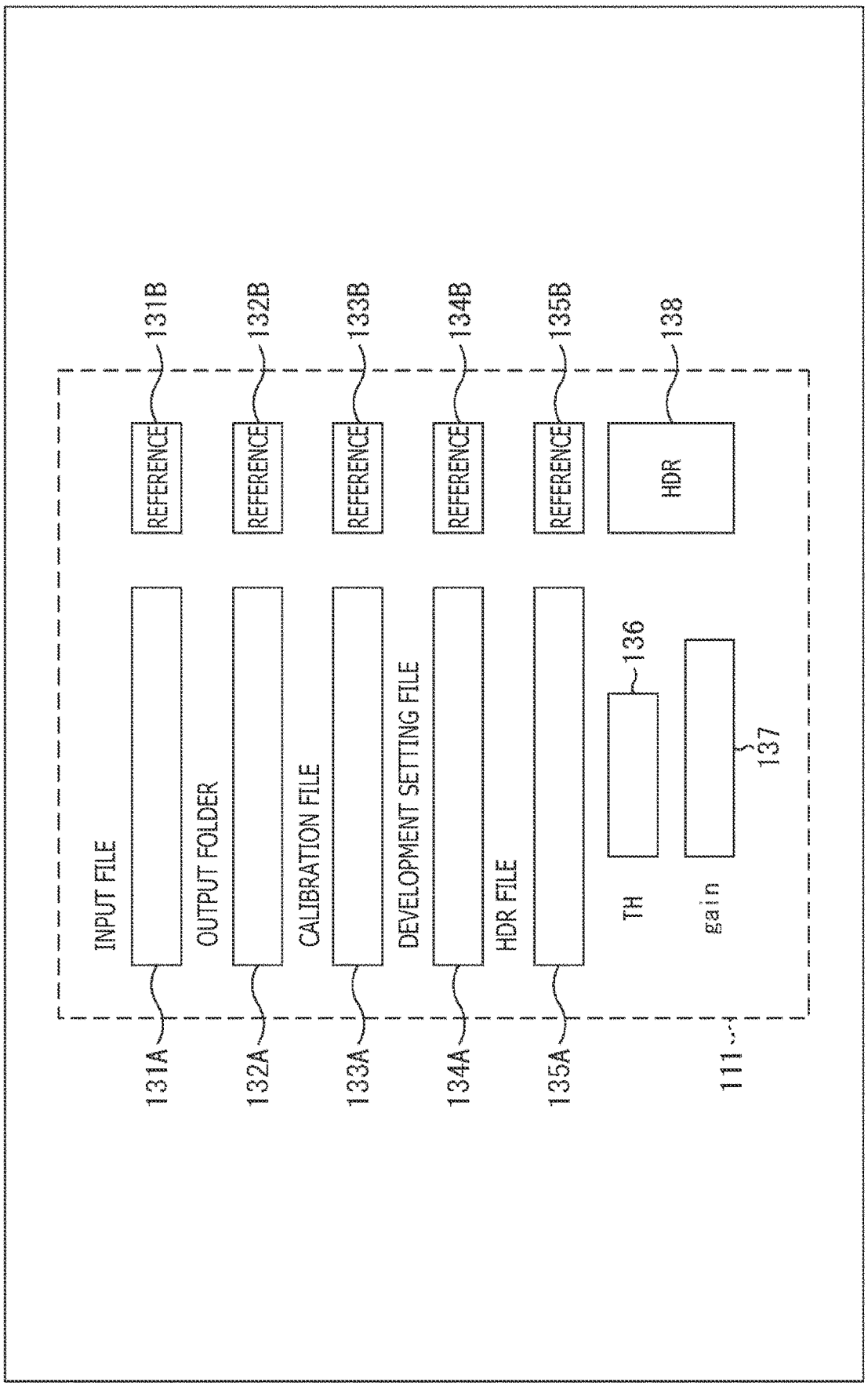

FIG. 9

| NO. | VALUE | //DESCRIPTION |
|-----|-------|---------------|
| 1 | 4 | //MODEL MODE |
| 2 | 14 | //BASELINE LENGTH |
| 3 | 5 | //CMN |
| 4 | 120 | //DepthMax INITIAL VALUE |
| 5 | 70 | //EDGE INITIAL VALUE |
| 6 | 8000 | //Raw_width |
| 7 | 5320 | //Raw_height |
| 8 | 2400 | //Pros_width |
| 9 | 1600 | //Pros_height |
| 10 | 3976 | //CenterPos[0].x |
| 11 | 2652 | //CenterPos[0].y |
| 12 | 1274 | //CenterPos[1].x |
| 13 | 4172 | //CenterPos[1].y |
| 14 | 1274 | //CenterPos[2].x |
| 15 | 1132 | //CenterPos[2].y |
| 16 | 6678 | //CenterPos[3].x |
| 17 | 1132 | //CenterPos[3].y |
| 18 | 6678 | //CenterPos[4].x |
| 19 | 4172 | //CenterPos[4].y |
| 20 | 950 | //CALIBRATION CHART WIDTH [mm] |
| 21 | 3528 | //CALIBRATION CHART WIDTH [pixel] |
| 22 | 1175 | //CAMERA-TO-CALIBRATION CHART DISTANCE [mm] |

| | | | |
|---|---|---|---|
| 152 | | | |
| 1 | MODEL INFORMATION | 21 | VIEWPOINT 0 CENTER COORDINATES |
| 2 | BASELINE LENGTH | 22 | VIEWPOINT 1 CENTER COORDINATES |
| 3 | VIEWPOINT COUNT | 23 | VIEWPOINT 1 CENTER COORDINATES |
| 4 | CALIBRATED VALUE | 24 | VIEWPOINT 2 CENTER COORDINATES |
| 5 | DepthMax INITIAL VALUE | 25 | VIEWPOINT 2 CENTER COORDINATES |
| 6 | EDGE INITIAL VALUE | 26 | VIEWPOINT 3 CENTER COORDINATES |
| 7 | PROCESS MARGIN | 27 | VIEWPOINT 3 CENTER COORDINATES |
| 8 | RESOLUTION | 28 | VIEWPOINT 4 CENTER COORDINATES |
| 9 | RESOLUTION | 29 | VIEWPOINT 4 CENTER COORDINATES |
| 10 | RESOLUTION | 30 | FOCAL POINT DISTANCE |
| 11 | RESOLUTION | 31 | PROVISIONAL VALUE |
| 12 | PROCESS RESOLUTION | 32 | LED COORDINATES |
| 13 | PROCESS RESOLUTION | 33 | LED COORDINATES |
| 14 | PROVISIONAL VALUE | 34 | LED COORDINATES |
| 15 | PROVISIONAL VALUE | 35 | LED COORDINATES |
| 16 | COLOR FILTER INFORMATION | 36 | LED PROCESS RESOLUTION |
| 17 | COLOR FILTER INFORMATION | 37 | CALIBRATION TIME INFORMATION |
| 18 | COLOR FILTER INFORMATION | 38 | CALIBRATION TIME INFORMATION |
| 19 | COLOR FILTER INFORMATION | 39 | CALIBRATION TIME INFORMATION |
| 20 | VIEWPOINT 0 CENTER COORDINATES | 40 | |

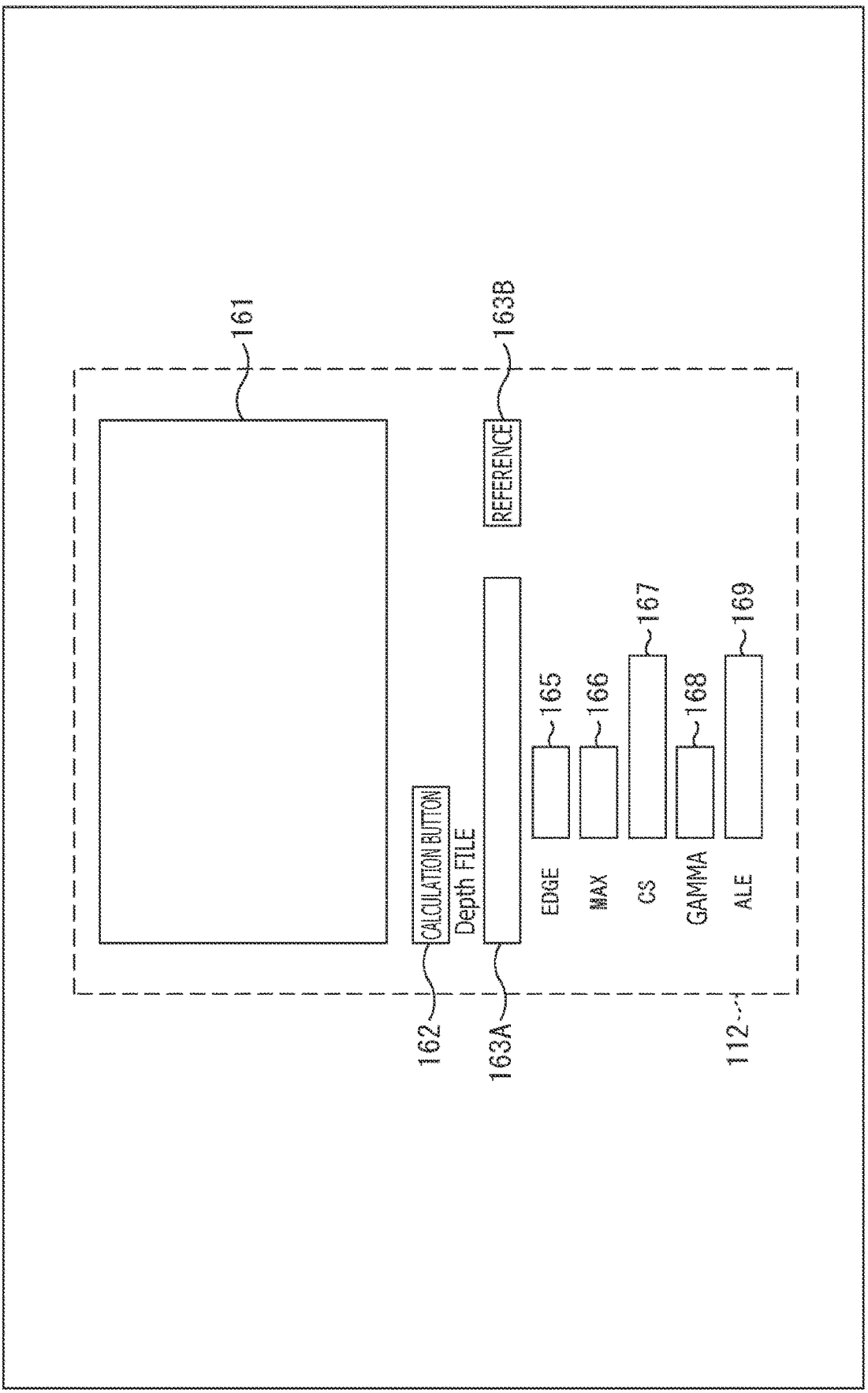

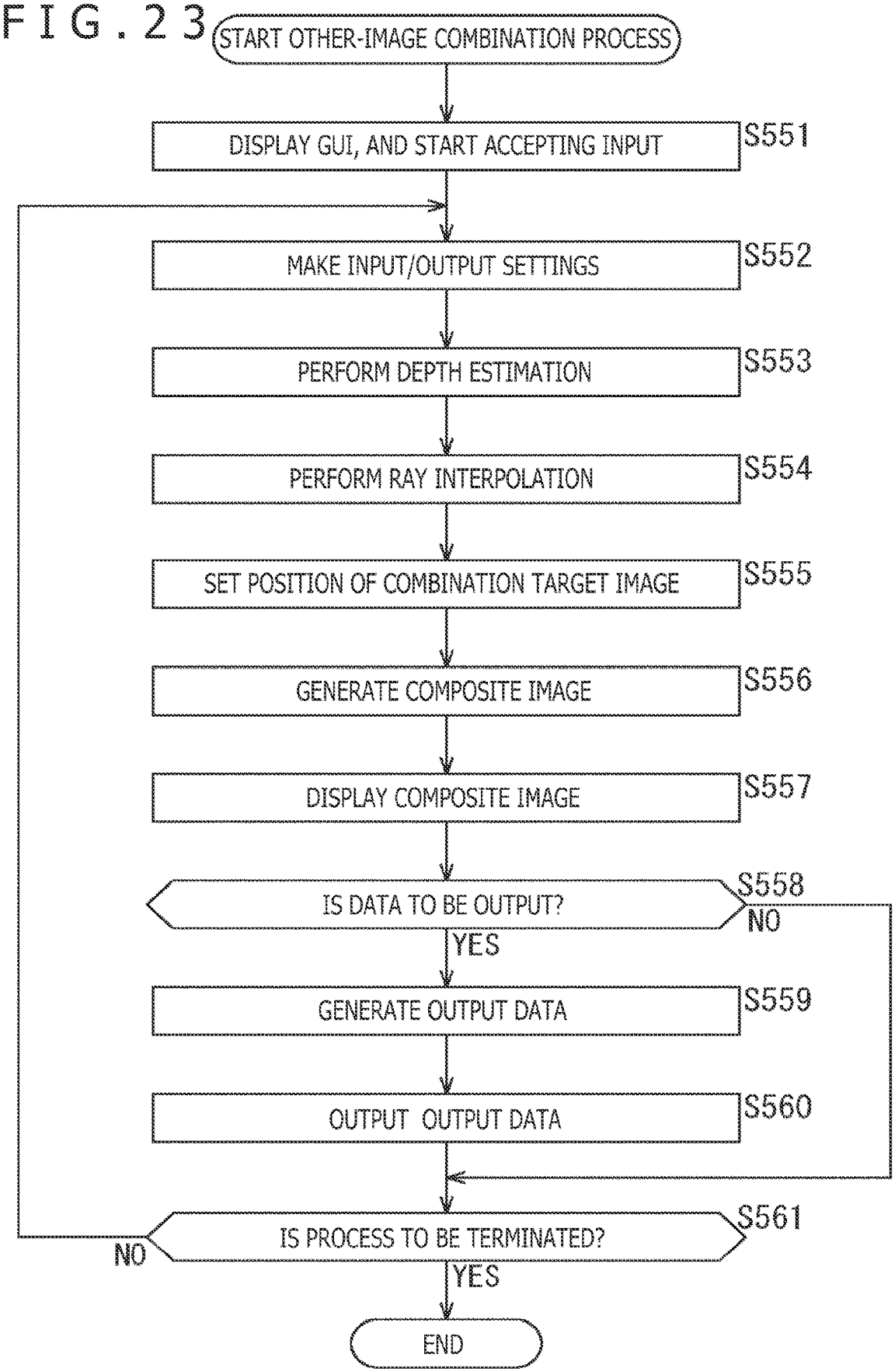

IMAGE PROCESSING APPARATUS, METHOD AND PROGRAM FOR GENERATING VIRTUAL IMAGES WITH AN ABERRATION TABLE

TECHNICAL FIELD

The present disclosure relates to an image processing apparatus, an image processing method, and a program. More particularly, the disclosure relates to an image processing apparatus, an image processing method, and a program for emulating lenses more easily.

BACKGROUND ART

Heretofore, it has been proposed that a virtual lens is emulated according to user settings in such a manner as to generate an image that appears to be captured through the emulated lens from a multi-view image including multiple images with viewpoints different from each other, before the generated image is offered to a user (for example, see PTL 1).

CITATION LIST

Patent Literature

[PTL 1]
PCT Patent Publication. No. WO2015/037472

SUMMARY

Technical Problem

The present disclosure is intended to emulate such virtual lenses more easily.

Solution to Problem

According to one aspect of the present technology, there is provided an image processing apparatus including an aberration table generation section configured to generate as aberration table as a table including converging ray vectors derived from aberrations of a lens selected through a user interface and targeted for emulation, and a light focusing processing section configured to perform a light focusing process to generate a virtual captured image taken of an object through the selected lens, by use of the aberration table and a multi-view image.

According to another aspect of the present technology, there is provided an image processing method including generating an aberration table as a table including converging ray vectors derived from aberrations of a lens selected through a user interface and targeted for emulation, and performing a light focusing process to generate a virtual captured image taken of an object through the selected lens, by use of the aberration table and a multi-view image.

According to a further aspect of the present technology, there is provided a program for causing a computer to function as an aberration table generation section configured to generate an aberration table as a table including converging ray vectors derived from aberrations of a lens selected through a user interface and targeted for emulation, and a light focusing processing section configured to perform a light focusing process to generate a virtual captured image taken of an object through the selected lens, by use of the aberration table and a multi-view image.

By use of the image processing apparatus, the image processing method, and the program according to some aspects of the present technology, the aberration table is generated as a table including converging ray vectors derived from aberrations of a lens selected through a user interface and targeted for emulation, and the light focusing process is performed to generate a virtual captured image taken of an object through the selected lens, by use of the aberration table and a multi-view image.

BRIEF DESCRIPTION OF DRAWINGS

FIG. 8 is a diagram depicting an exemplary input/output setting section.

FIG. 9 is a diagram depicting an exemplary calibration file.

FIG. 10 is a diagram listing exemplary parameters included in a development setting file, FIG. 11 is a diagram depicting an exemplary depth estimation section.

FIG. 23 is a flowchart explaining an exemplary flow of a combination process.

DESCRIPTION OF EMBODIMENT

One mode for implementing the present disclosure (hereinafter referred to as the embodiment) is described below. The description is made is the following order.

1. Lens emulation.
2. First embodiment (development processing apparatus)
3. Additional notes

1. LENS EMULATION

<Multi-View Image>

Figure 1:
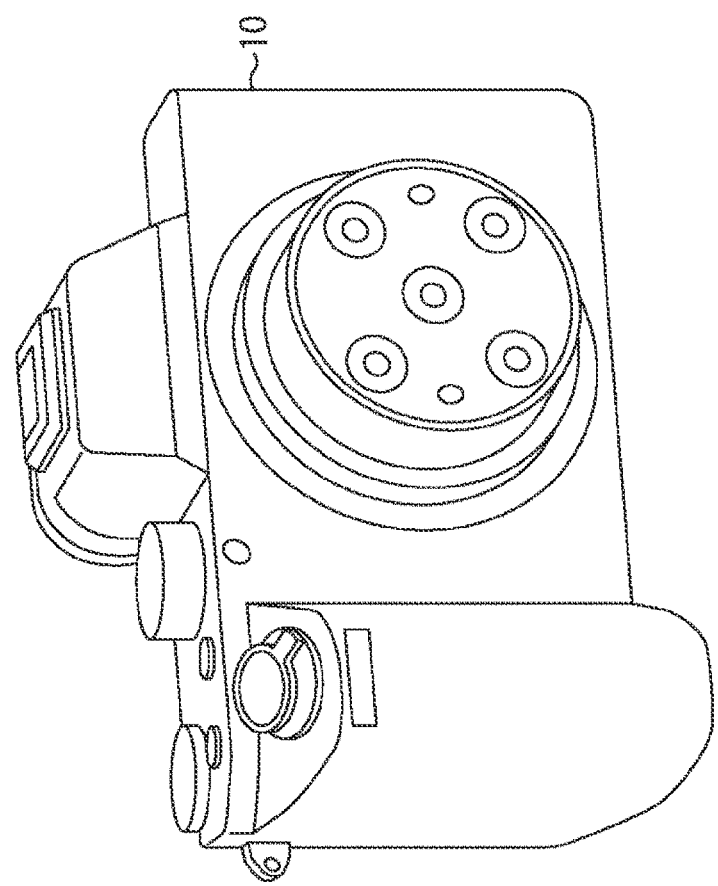
FIG. 1 is a perspective diagram depicting an exemplary camera.

An imaging apparatus for generating a multi-view image that includes multiple images with viewpoints different from each other and that is necessary for performing lens emulation may be configured like a camera 10 in FIG. 1, for example. The camera 10 with a built-in image sensor captures an object by receiving light collected through lenses and by subjecting the collected light to photoelectric conversion, thereby generating a multi-view image of the object.

The camera 10 has a lens tube disposed in front of its image sensor (on the light incident side) and equipped with multiple (e.g., 5) facet optical systems. The multiple facet optical systems are configured to provide light paths of transmitted light that are independent of each other. That is, the light transmitted through each facet optical system of the lens tube is not incident on any other facet optical system, and irradiates one of mutually different positions on a light-receiving surface of the image sensor (e.g., effective pixel region) lit by the facet optical systems. On the light-receiving surface of the image sensor, the optical axis of each facet optical system is at least in one of mutually different spots occupied by the optical axes of the facet optical systems. At least part of the light transmitted through each facet optical system irradiates one of the mutually different positions on the light-receiving surface of the image sensor.

As a result, in a captured image generated by the image sensor (i.e., whole image output from the image sensor), images of the object formed by the individual facet optical systems appear in mutually different positions. In other words, the images with their viewpoints from the individual facet optical systems are obtained from the captured image.

Figure 2:
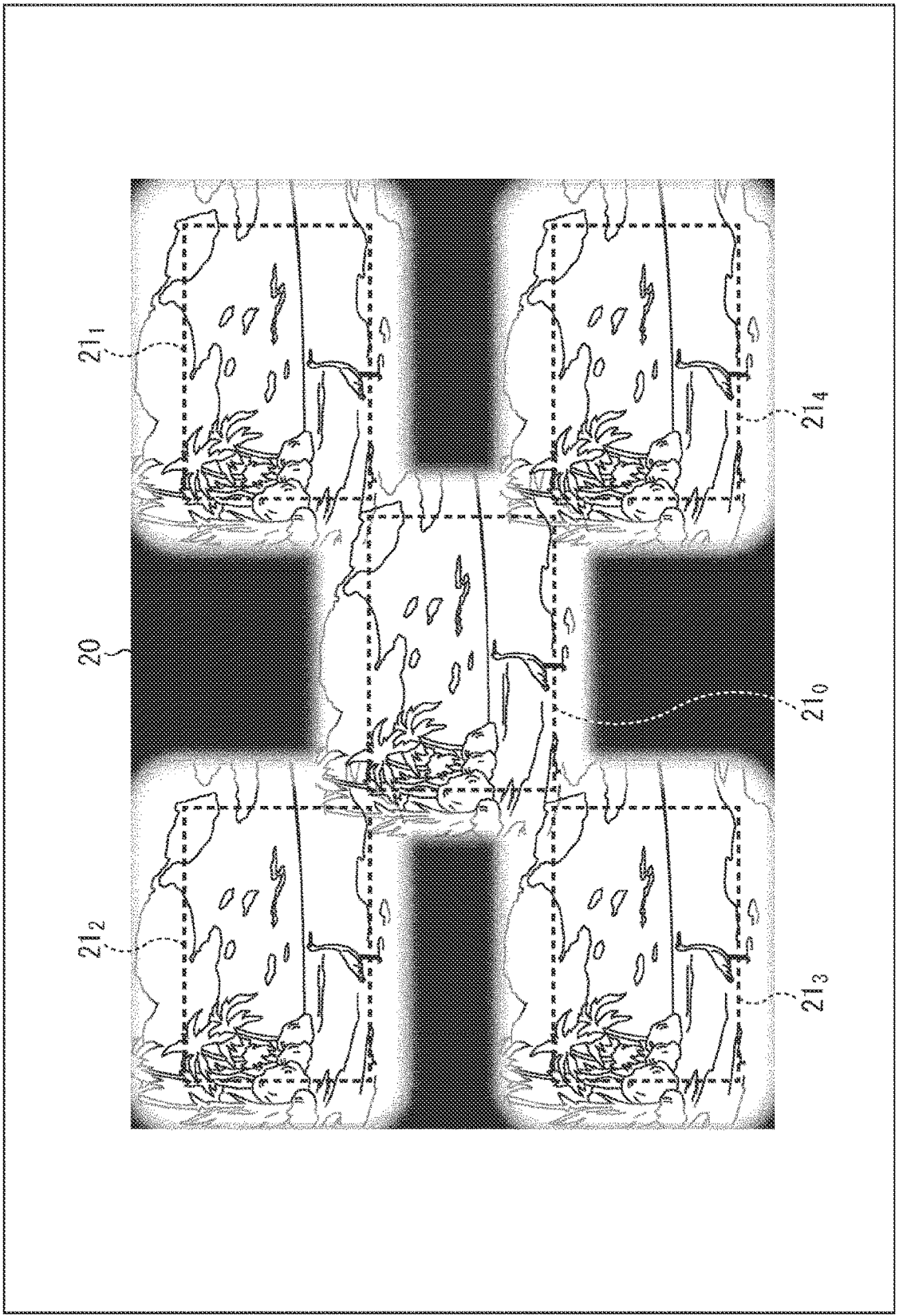
FIG. 2 is a diagram depicting an exemplary whole image.

For example, a whole image 20 such as the one illustrated in FIG. 2 is acquired by the camera 10 capturing the object. The whole image 20 includes facet images each corresponding to each of the individual facet optical systems (i.e., images obtained by subjecting to photoelectric conversion the light coming from the object and incident through the individual facet optical systems). In the case of the example of FIG. 2, five facet images are included in the whole image 20.

It is to be noted that the whole image 20 may be an entire captured image generated by the image sensor or a partial image clipped from the captured image (but including all facet images). In addition, the whole image 20 may be a RAW format image or a IC format image. It is to be noted that the number of the facet images included in the whole image 20 may be any number (but dependent on the number of the facet optical systems disposed in the camera 10).

A part of each facet image is clipped to generate a viewpoint image with its viewpoint coming from the corresponding facet optical system. In the case of the example of FIG. 2, images may be clipped from five viewpoint image regions 21 of the whole image 20, i.e., a viewpoint image region $21_0$, a viewpoint image region $21_1$, a viewpoint image region $21_2$, a viewpoint image region $21_3$, and a viewpoint image region $21_4$. The images clipped from the viewpoint image regions 21 are each regarded as a viewpoint image. That is, a multi-view image can be obtained from the whole image 20. In other words, acquiring the whole image 20 is substantially equivalent to obtaining the multi-view image.

Figure 3:
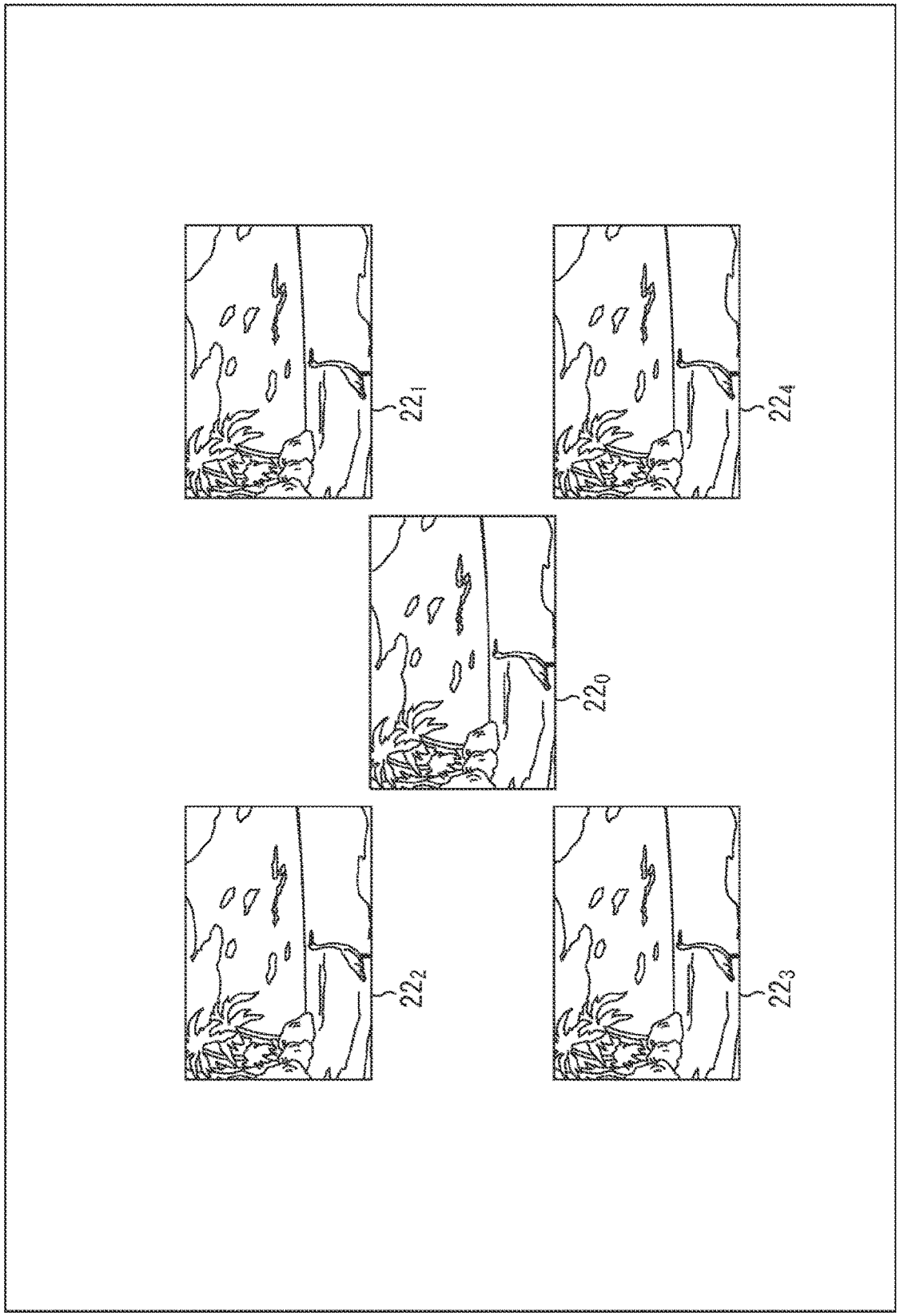
FIG. 3 is a diagram depicting exemplary facet images.

In addition, in another example, multiple viewpoint images such as those illustrated in FIG. 3 may be obtained by the camera 10 capturing the object. In FIG. 3, a viewpoint image $22_0$, a viewpoint image $22_1$, a viewpoint image $22_2$, a viewpoint image $22_3$, and a viewpoint image $22_4$ correspond to the individual facet optical systems of the camera 10 (i.e., these are viewpoint images with their viewpoints coming from the facet optical systems). That is, the viewpoint images 22 may be said to be images clipped from each of the abovementioned viewpoint image regions 21 of the whole image 20. The multi-view image is acquired is such a manner.

Whereas FIG. 3 depicts exemplary viewpoint images 22 obtained in single image capture by the camera. 10, the number of the viewpoint images 22 may be any number (but dependent on the number of the facet optical systems disposed in the camera 10.

Figure 4:
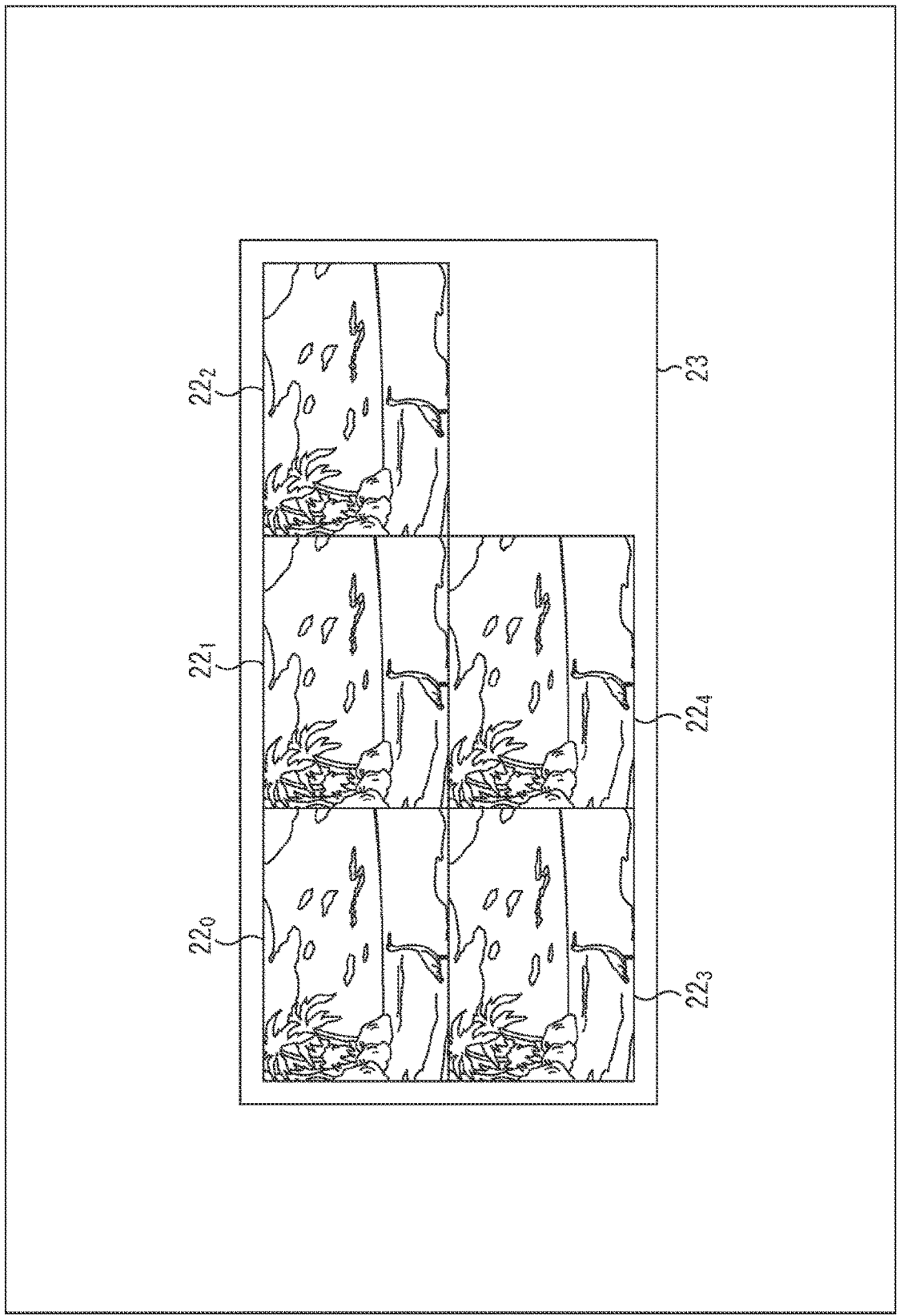
FIG. 4 is a diagram depicting an exemplary composite image.

In addition, in another example, a multiple-viewpoint composite image 23 such as the one illustrated in FIG. 4 may be obtained by the camera 10 capturing the object. The multiple-viewpoint composite image 23 in FIG. 4 is an image that includes multiple viewpoint images 22 being composed into a single image (i.e., frame). Obviously, each viewpoint image 22 can be clipped from the multiple-viewpoint composite image 23. That is, a multi-view image can be obtained from the multiple-viewpoint composite image 23. In other words, acquiring the multiple-viewpoint composite image 23 is substantially equivalent to obtaining the multi-view image.

The camera 10 can acquire the multi view image by capturing the object as described above. The multi-view image can be used in such processes as generation of depth information and a refocusing process using the depth information, for example.

It is to be noted that any suitable method may be used to generate the multi-view image. Apparatuses or systems other than the camera 10 may be used for image generation. For example, the multi-view image may be generated by capturing the object with use of multiple cameras (i.e., multiple image sensors) serving as mutually different viewpoints.

<Use of the Multi-View image>

For example, a stereo matching technique may be used to, given a multi-view image including multiple viewpoint images with their viewpoints different from each other, obtain depth data indicative of the distance to the object in the multi-view image, the depth data being used to generate an image by superposing the viewpoint images constituting the multi-view image. The generated image may then be offered to the user.

Figure 5:
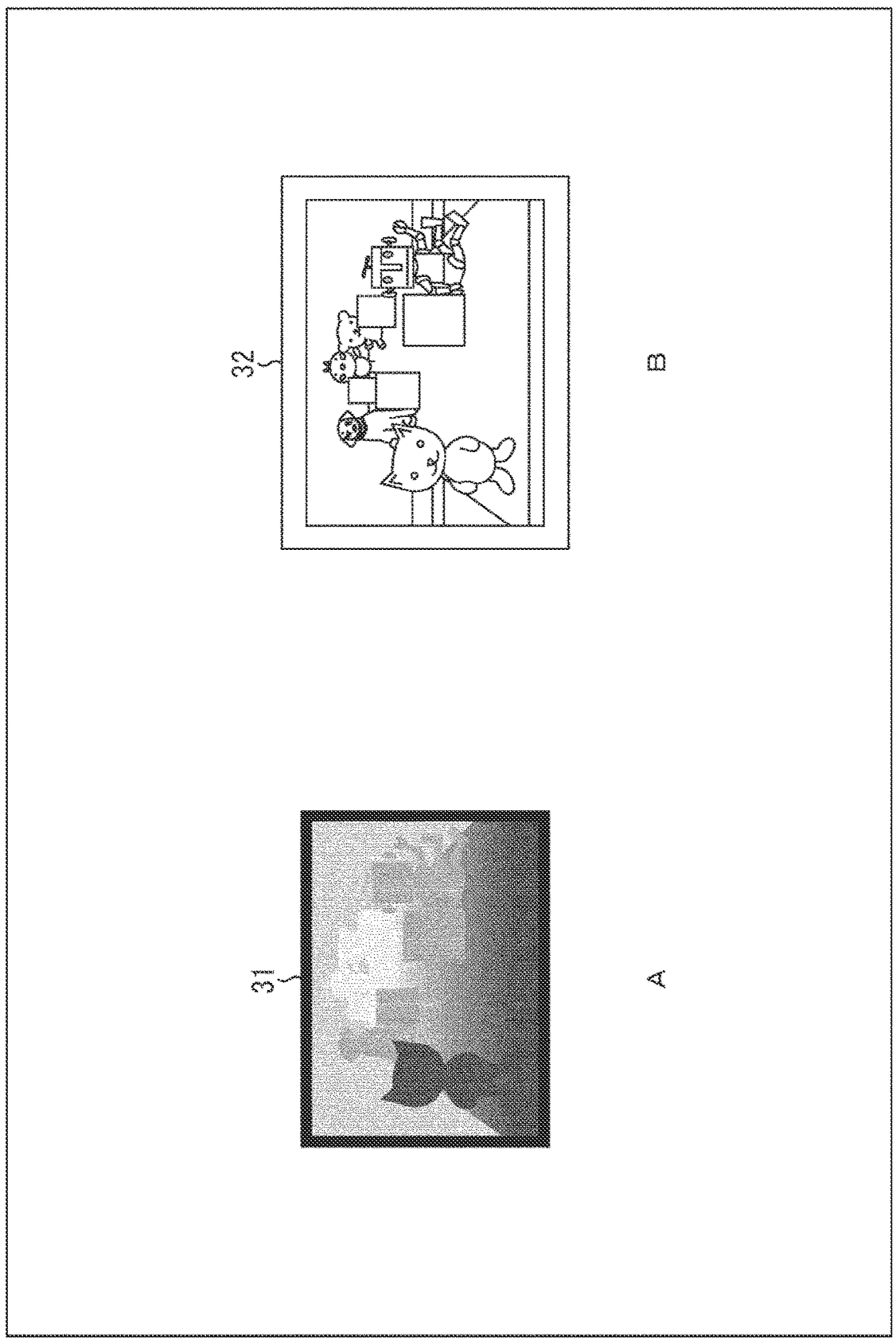
FIG. 5 depicts diagram illustrating examples of a captured image and a depth image.

Techniques such as those described above may be used to generate from the multi-view image a depth image 31 such as the one illustrated in Subfigure A of FIG. 5. The depth image 31 is an image in which the distance to the object from each pixel of the captured image is regarded as a pixel value. That is, the depth image 31 is depth data being turned into an image. In addition, the viewpoint images constituting a multi-view image in proportions determined by the depth image 31 are superposed (combined) to form a virtual captured image 32 such as the one illustrated in Subfigure B of FIG. 5.

The above-described techniques make it possible, for example, to generate the virtual captured image 32 by setting the focal point distance as desired. That is, the virtual captured image 32 may be generated by setting, as desired, lens parameters that are parameters related to lenses. In other words, with a virtual lens set, a virtual captured image can be generated in a manner emulating the image of the object captured through the virtual lens. That is, lens emulation can be carried out.

Figure 6:
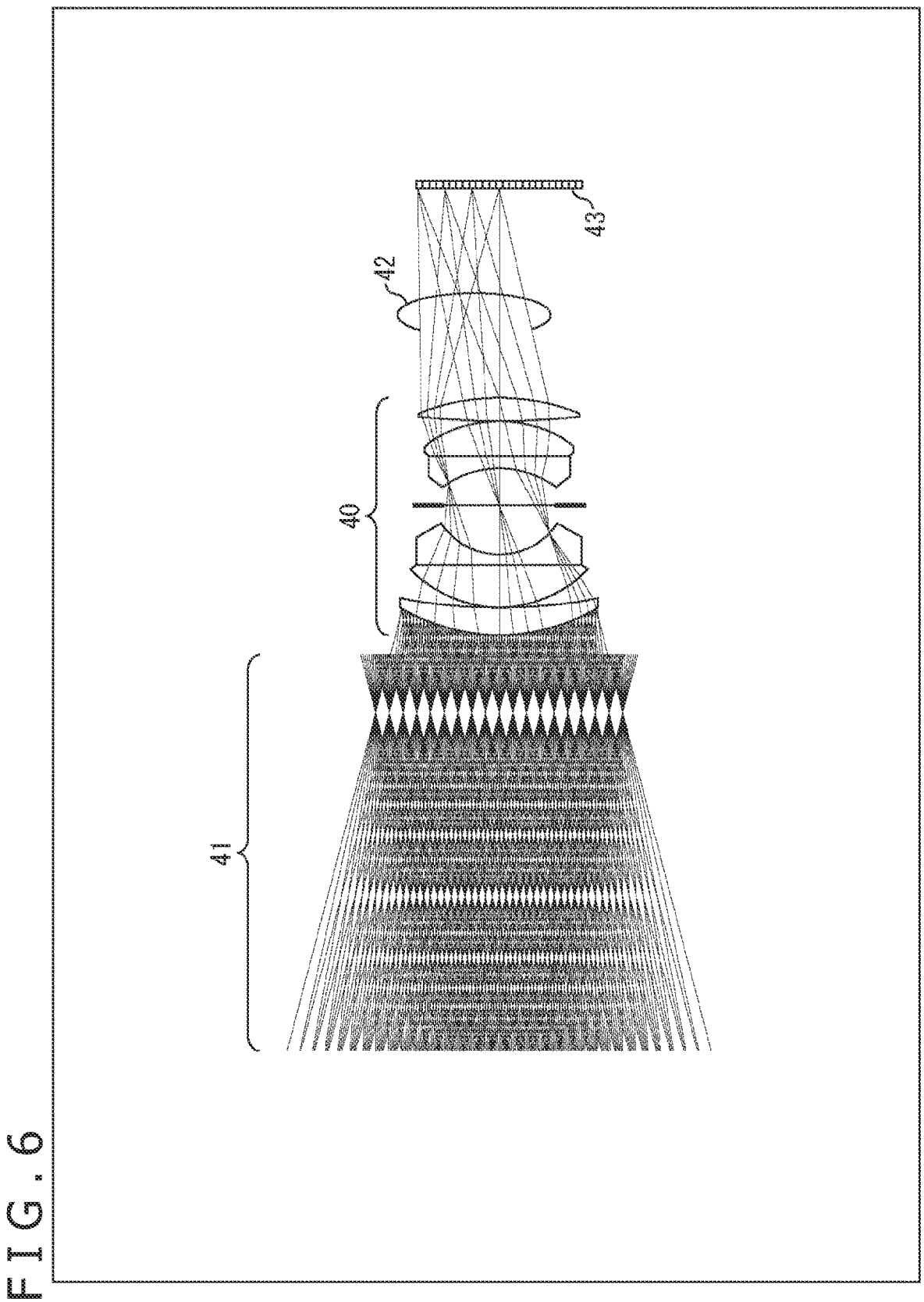
FIG. 6 is a diagram explaining lens emulation.

For example, a virtual lens 40 such as the one illustrated in FIG. 6 is set. A ray vector 41, which is incident light from the object, enters the virtual lens 40. The incident light that has passed through the virtual lens 40 forms a ray vector 42. An imaging system that includes an image sensor 43 acquiring a captured image from the ray vector 42 then emulated (i.e., simulated). Following this, a virtual captured image is Generated from a multi-view image according to this emulation.

Lens emulation of the above kind allows an optical system of desired specifications to be emulated. That is, the target for emulation may be an actual optical system or an unrealistic optical system. Such emulation permits reproduction of captured images that are obtained by diverse optical systems. For example, it is easy to reproduce a captured image acquired by an optical system with an aperture larger than that of the optical system used to generate a multi-view image; a captured image with a resolution higher than that of the multi-view image; a captured image at an angle wider than that of the multi-view image; or a captured image with a narrower viewing angle and a longer focal point distance than those of the multi-dew image. It is thus possible to easily reproduce captured images that are obtained by use of high-performance lenses or to reproduce captured images acquired by unrealistic optical systems. That is, more diverse captured images (virtual captured images) can be generated at a lower cost.

<Setting of Aberrations Through Lens Selection>

The present disclosure proposes that an aberration table is generated as a table including converging ray vectors derived from aberrations of a lens selected through a user interface and targeted for emulation and that a light focusing process is performed to generate a virtual captured image taken of an object through the selected lens, by use of the aberration table and a multi-view image.

In such a manner, it is possible to eliminate the work of setting aberration-related parameters and to thereby carry out lens emulation more easily.

It is to be noted that the captured image generated by the light focusing process is an image obtained by virtual image capture using the selected lens. Hence, the captured image may be said to be a virtual captured image. The lens selected here may or may not be used in actual image capture and may or may not exist in the real world.

<Development Screen>

The above-described lens emulation using the multi-view image may be implemented by an application program that performs the processes involved according to user's operation input. For example, the application program may cause a monitor to display a GUI (Graphical User Interface) for accepting the user's selection of the lens targeted for emulation.

For example, a display section may be caused to display a user interface that includes icons corresponding to the lenses as candidates targeted for emulation. The lens parameters of the lens corresponding to the icon selected through the user interface may be used to generate the aberration table.

Figure 7:
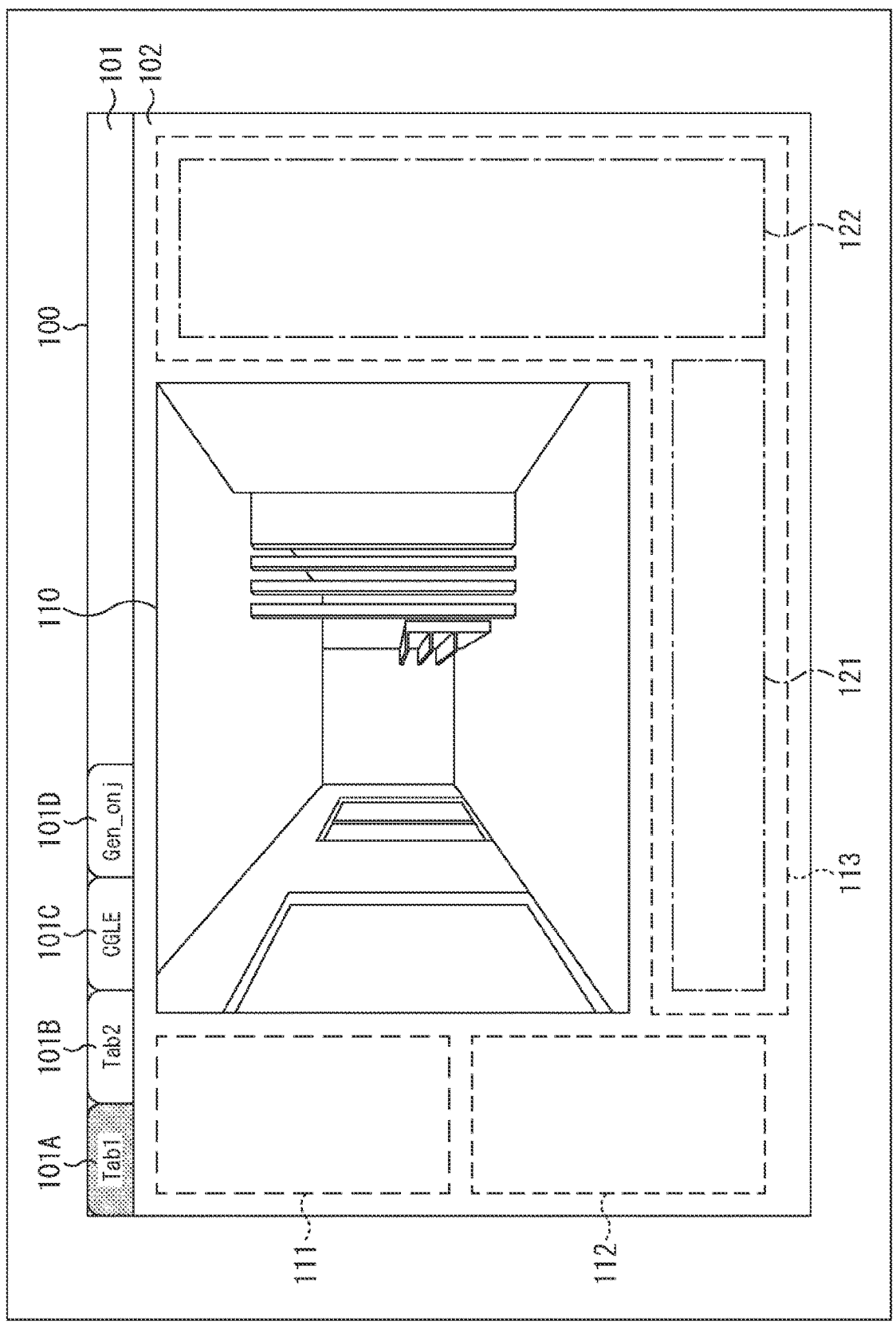
FIG. 7 is a diagram depicting an exemplary development screen.

A development screen 100 illustrated in FIG. 7 is a GUI displayed on the monitor by the application program, for carrying out a multi-view image development process. In the multi-view image development process, the application program performs lens emulation by using the multi-view image as described above, for example, to generate a virtual captured image taken of the object through the emulated lens. At that point, the application program causes the monitor to display the development screen 100 such as the one illustrated in FIG. 7, and accepts user operations performed according to the development screen 100.

As depicted in FIG. 7, the development screen 100 includes a tab display section 101 and a GUI display section 102. The tab display section 101 displays tabs for changing GUIs appearing in the GUI display section 102. In the case of the example of FIG. 7, the tab display section 101 displays a tab 101A (Tab1), a tab 101B (Tab2), a tab 101C (CGLE), and a tab 101D (Gen_onj). The number of tabs to be displayed in the tab display section 101 may be any number.

The GUI display section 102 displays the GUI corresponding to the tab selected in the tab display section 101. In the example of FIG. 7, the tab 101A is selected, so that the GUI corresponding to the tab 101A is displayed in the GUI display section 102. This GUI is a GUI intended for lens emulation.

As depicted in FIG. 7, this GUI includes a captured image display section 110, an input/output setting section. 111, a depth estimation section 112, and a lens emulation section 113.

The captured image display section 110 can display a captured image (virtual captured image) that is generated by and that results from the light focusing process in image capture using the emulated lens, as the result of the light focusing process. By checking the captured image displayed in the captured image display section. 110, the user can recognize the result of the light focusing process.

It is to be noted that lens emulation can be performed by use of a resolution-reduced multi-view image. In this case, the virtual captured image resulting from the emulation has a resolution lower than that of the original multi-view image (i.e., multi-view image yet to be resolution-reduced). That is, the captured image display section 110 displays the resolution-reduced virtual captured image. In other words, the captured image display section 110 can display the virtual captured image with its resolution lower than that of the original multi-view image obtained by actual image capture. This makes it possible to suppress increase in load caused by the light focusing process and the display of the result therefrom. Consequently, the light focusing process and the display of the result therefrom are carried out at higher speed without higher cost being incurred. The captured image display section 110 can thus display the result of the light focusing process at higher speed, for example. It is to be noted that, obviously, the original multi-view image may be used in the light focusing process. In this case, a virtual captured image with a resolution equivalent to that of the original multi-view image is obtained as a result of the light focusing process. That is, the captured image display section 110 may display the virtual captured image with its resolution equivalent to that of the original multi-view image.

The input/output setting section 111 is a GUI for inputting information regarding input/output settings. The depth estimation section 112 is a GUI for depth estimation. The lens emulation section 113 is a GUI for lens emulation. The lens emulation section 113 includes a lens selection section 121 and a lens setting section 122. The lens selection section 121 is a GUI for selecting the lens targeted for emulation. The lens setting section 122 is a GUI for setting lenses. The configuration of each of these GUIs is explained below.

<Input/Output Setting Section>

FIG. 8 depicts an example of the input/output setting section 111. The input/output setting section 111 is a GUI for inputting the information regarding input/output settings. The information input through the input/output setting section 111 is accepted by the application program for making input/output settings.

For example, the input/output setting section 111 includes an input file designation field 131A and a reference button 131B. The input file designation field 131A is a GUI for setting a file to be input (the file is also referred to as the input file). The input file includes, for example, the data of the multi-view image for use in the light focusing process. That is, the multi-view image to be input is designated by the input file being specified. The user can operate, for example, a keyboard or the like to input a file name and an address to the input file designation field 131A with use of characters and symbols. The file designated by the file name and the address input to the input file designation field 131A is set as the input file. That is, the data of the multi-view image, for example, included in the input file is loaded into the application program.

The reference button 131B is a GUI button for designating the input file by use of a file management GUI. When the user operates the reference button 131B, the file management GUI is activated. The user designates the file by using the file management GUI. When the file is designated, the file name and the address of the file are input to the input file designation field 131A. That is, the file is set as the input file. Specifically, the data of the multi-view image, for example, included in the input file is loaded.

The input/output setting section. 111 also includes an output folder designation field 132A and a reference button 132B. The output folder designation field 132A is a GUI for setting a folder (also referred to as the output folder) to which to output a file including, for example, the data of the captured image resulting from the light focusing process. The user can operate, for example, a keyboard or the like to input a folder name and an address to the output folder designation field 132A with use of characters and symbols. The folder designated by the folder name and the address input to the output folder designation field 132A is set as the output folder. That is, the generated file is stored into the output folder.

The reference button 132B is a GUT button for designating the output folder by use of a file management GUI. When the user operates the reference button 132B, the file management GUI is activated. The user designates the folder by using the file management GUI. When the folder is designated, the folder name and the address of the folder are input to the output folder designation field. 132A. That is, the folder is set as the output folder. Specifically, the generated file is stored into the output folder.

The input/output setting section 111 further includes a calibration file designation field 133A and a reference button 133B. The calibration file designation field. 133A is a GUT for setting a file that describes, for example, calibration data for identifying the information regarding distortions between viewpoints (the file is also referred to as the calibration file). That is, the calibration data to be used for calibration between viewpoints is set by designation of the calibration file. The user can operate, for example, a keyboard or the like to input a file name and an address to the calibration file designation field 133A with use of characters and symbols. The file designated by the file name and the address input to the calibration file designation field 133A is set as the calibration file. That is, the calibration data included in the calibration file, for example, is loaded.

The reference button 133B is a GUI button for designating the calibration file by use of a file management GUI.

When the user operates the reference button 133B, the file management GUI is activated. The user designates the file by using the file management GUI. When the file is designated, the file name and the address of the file are input to the calibration file designation field 133A. That is, the file is set as the calibration file. Specifically, the calibration data included in the calibration file, for example, is loaded.

A table 151 illustrated in FIG. 9 is an example of information described in the calibration file. For example, a model mode is information indicative of the mode of the camera 10. A baseline length is information indicative of the distance between individual facet optical systems. GME is information indicative of the number of the facet optical systems involved (i.e., number of viewpoints). A DepthMax initial value is information indicative of the initial value of a maximum depth value (DepthMax), to be discussed later. An EDGE initial value is information indicative of the initial value of EDGE, to be described later.

Raw_width is information indicative of the width of a RAW image, i.e., the width (resolution in the horizontal direction) of a whole captured image obtained by the image sensor of the camera 10. Raw_height is information indicative of the height. (resolution in the vertical direction) of the whole captured image. Pros_width information indicative of the width (resolution in the horizontal direction) of each viewpoint image. Pros_height is information indicative of the height (resolution in the vertical direction) of each viewpoint image.

CentrePros[N].x (N is an integer between 0 and 4) represents the a coordinate of the center of each viewpoint image in the whole captured image obtained by the image sensor of the camera 10. CentrePros[N].y (N is an integer between 0 and 4) represents the y coordinate of the center of each viewpoint image in the whole captured image. It is to be noted that the symbol N represents an identification number of the viewpoint image (from each facet optical system). For example, since the camera 10 in FIG. 1 has five viewpoints, N is set with 0, 1, 2, 3, or 4.

A calibration chart width [mm] is information indicative of the width, is terms of length [mm], of a chart used for calibration (the chart is also referred to as the calibration chart) (see PCT Patent Publication No. WO2019/078032, for example). A calibration chart width [pixel] is information indicative of the width, in terms of resolution [pixel], of the calibration chart. Further, a camera-to-calibration chart distance [mm] is information indicative of the distance [mm] from the camera 10 to the calibration chart at the time of image capture for calibration (i.e., calibration chart depth value).

The above items of information are set when the calibration file is designated. Naturally, the content of the calibration file is not limited to anything specific. For example, calibration data other than what is depicted in the example of FIG. 9 may be included. Part of the calibration data depicted in FIG. 9 may not be included.

Described with reference to FIG. 8 again, the input/output setting section. 111 includes a development setting file designation field 134A and a reference button 134B. The development setting file designation field 134A is a GUI for setting a file in which hardware information such as viewpoint count information and baseline length is described (the file is also referred to as the development setting file). The user can operate, for example, a keyboard or the like to input a file name and an address to the development setting file designation field 134A with use of characters and symbols. The file designated by the file name and the address input to the development setting file designation field 134A is set as the development setting file. That is, the hardware information included in the development setting file, for example, is loaded.

The reference button 134B is a GUI button for designating the development setting file by use of a file management GUI. When the user operates the reference button 134B, the file management GUI is activated. The user designates the file by using the file management GUI. When the file is designated, the file name and the address of the file are input to the development setting file designation field 134A. That is, the file is set as the development setting file. Specifically, the hardware information included in the development setting file, for example, is loaded.

A table 152 illustrated in FIG. 10 is an example of the hardware information described in the development setting file. For example, the development setting file includes diverse hardware information such as model information, baseline length, viewpoint count, calibrated values, Depth-Max initial value, EDGE initial value, process margin, resolution, process resolution, provisional values, color filter information, viewpoint N center coordinates, focal point distance, LED coordinates representing the coordinates of spot light for detecting lens mounting error (for example, see PUT Patent Publication No. WO2019/78032), LED process resolution indicative of the process resolution of the spot light (for example, see PCT Patent Publication No. WO2019/78032), and calibration time information. These items of information are set when the development setting file is designated. Naturally, the content of the development setting file is not limited to anything specific. For example, hardware information other than what is depicted in FIG. 10 may be included. Part of the hardware information depicted in FIG. 10 may not be included.

Described with reference to FIG. 8 again, the input/output setting section 111 includes an HDR (High Dynamic Range) file designation field 135A and a reference button 135B. The HDR file designation field 135A is a GUI for setting a file that enables estimation of a saturated luminance value (the file is also referred to as the HDR file). The user can operate, for example, a keyboard or the like to input a file name and an address to the HDR file designation field 135A with use of characters and symbols. The file designated by the file name and the address input to the HDR file designation field 135A is set as the HDR file. That is, the information included in the HDR file is loaded.

The reference button 135B is a GUI button for designating the HDR file using a file management GUI. When the user operates the reference button 135B, the file management GUI is activated. The user designates the file using the file management GW. When the file is designated, the file name and the address of the file are input to the HDR file designation field 135A. That is, the information included in the HDR file is loaded.

The input/output setting section 111 also includes a threshold value designation field 136, a gain designation field 137, and an HDR button 138.

The threshold value designation field 136 is a GUI for setting a threshold value (TH). The user can operate, for example, a keyboard or the like to input a threshold value to the threshold value designation field 136. The numerical value input to the threshold value designation field. 136 is set as the threshold value.

The gain designation field 137 is a GUI for setting a gain. The user can operate, for example, a keyboard or the like to input a gain numerical to the gain designation field 137. The numerical value input to the gain designation field 137 is set as the gain.

The HDR button. 138 is a GUI for starting an HDR process. When the user operates the HDR button 138, the HDR process is started. At this point, the HDR file designated in the HDR file designation field 135A is used to perform the process. Incidentally, the HDR file and the HDR process to be used here may be those disclosed in PCT Patent Publication No. WO2016/175043, for example.

<Depth Estimation Section>

FIG. 11 is a diagram depicting an example of the depth estimation section 112. The depth estimation section 112 is a GUI for inputting information regarding depth estimation. The information input through the depth estimation section 112 is accepted by the application program, for use in depth estimation.

For example, the depth estimation section 112 includes a depth image (depth map) display field 161 and a calculation button 162. The depth image display field 161 is a GUI for displaying a depth image including the depth values of the pixels in the object resulting from depth estimation. That is, the depth image displayed is the depth image display field 161 includes the depth values estimated through depth estimation.

The calculation button 162 is a GUI for designating the start of the depth estimation (depth calculation). When the user operates the calculation button 162, the depth estimation is started.

The depth estimation section. 112 also includes a depth file designation field 163A and a reference button 163B. The depth file designation field 163A is a GUI for setting a file to be used in a case of externally inputting depth data (the file is also referred to as the depth file). The user can operate, for example, a kevboard or the like to input a file name and an address to the depth file designation field 163A with use of characters and symbols. The file designated by the file name and the address input to the depth file designation field 163A is set as the depth file. That is, the depth data included in the depth file, for example, is loaded.

The reference button 163B is a GUI button for designating the depth file by use of a file management GUI. When the user operates the reference button 163B, the file management file GUI is activated. The user designates the file by using the file management GUI. When the file is designated, the file name and the address of the file are input to the depth file designation field 163A. That is, the file is set as the depth file. Specifically, the depth data included in the depth file, for example, is loaded.

The depth estimation section 112 also includes an EDGE designation field 165, a MAX designation field 166, a CS designation field 167, a gamma designation field 168, and an ALE designation field 169. The EDGE designation field 165 is a GUI for designating an EDGE threshold value setting for separating noise from signals by use of shutter speed/gain values at the time of image capture. The user can operate, for example, a keyboard or the like to numerically input values to the EDGE designation field 165. The numerical value input to the EDGE designation field 165 is set as the EDGE threshold value.

The MAX designation field 166 is a GUI for designating the range for detecting a maximum pixel misalignment amount. The user can operate, for example, a keyboard or the like to numerically input values to the MAX designation field 166. The numerical value input to the MAX designation field. 166 is set as the maximum pixel misalignment detection range MAX.

The CS designation field 167 is a GUT for designating an infinite distance at the time of calibration. The user can operate, for example, a keyboard or the like to numerically input values to the CS designation field 167. The numerical value input to the CS designation field 167 is set as the infinite distance (CS) at the time of calibration.

The gamma designation field. 168 is a GUI for designating a gamma curve for use at the time of depth estimation. The user can operate, for example, a keyboard or the like to numerically input values to the gamma designation field 168. The numerical value input to the gamma designation field. 168 is set as the gamma value.

The ALE designation field 169 is a GUI for designating a rotation angle ALE that can be corrected in the rotation direction at the time of calibration data capture. The user can operate, for example, a keyboard or the like to numerically input values to the ALE designation field 169. The numerical value input to the ALE designation field 169 is set as the rotation angle ALE that can be corrected in the rotation direction at the time of calibration data capture.

<tens selection section>.

Figure 12:
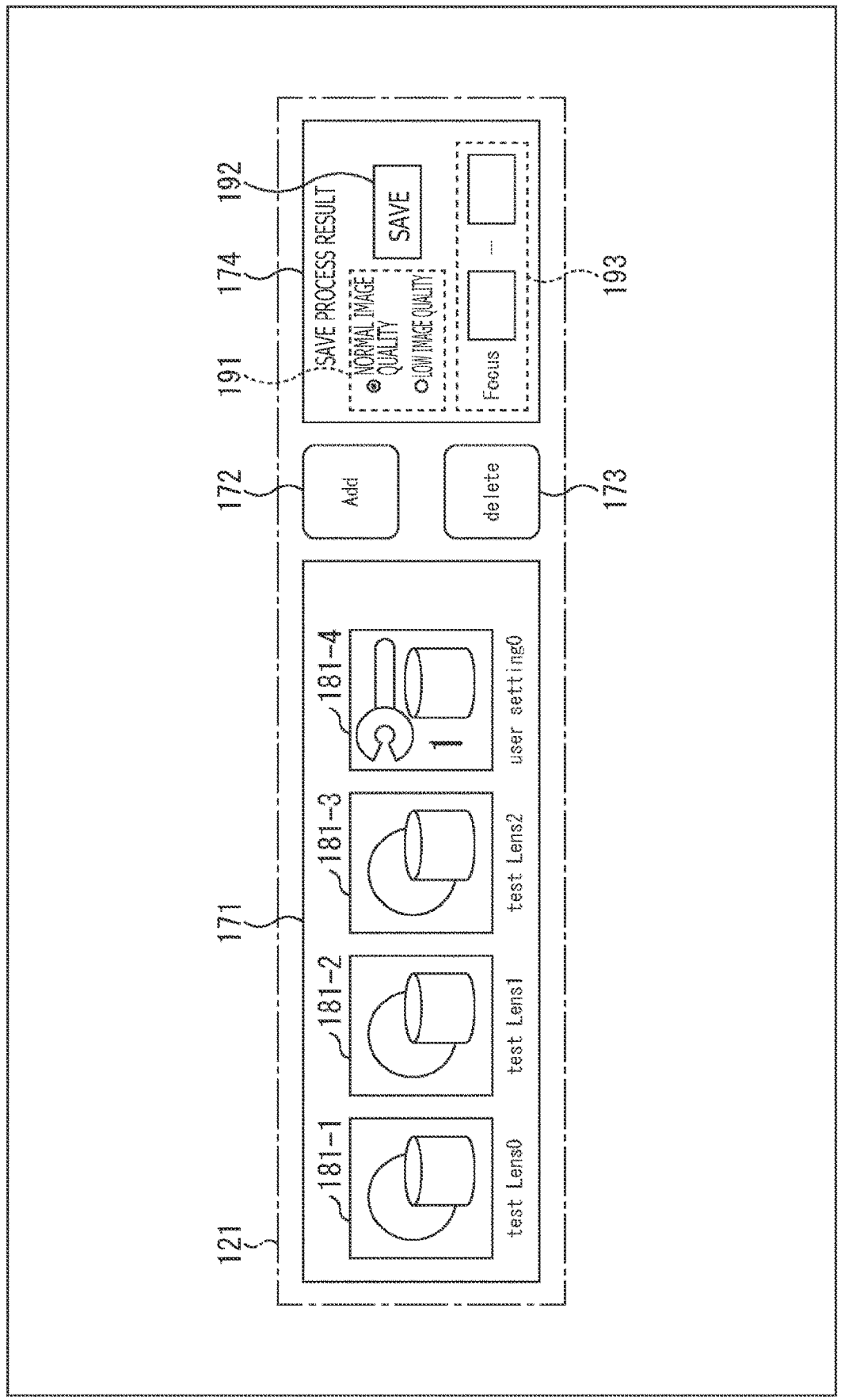
FIG. 12 is a diagram depicting an exemplary lens selection section.

FIG. 12 is a diagram depicting an example of the lens selection section 121. The lens selection section 121 is a GUI for designating the lens targeted for emulation. The information input through the lens selection section 121 is accepted by the application program, for use in lens simulation.

For example, the lens selection section 121 includes a lens icon display section 171, an add button 172, a delete button 173, and a process result saving section 174.

The lens icon display section 171 is a GUI for selecting the lens targeted for emulation, and includes icons that correspond to the lenses as candidates targeted for emulation. In the case of the example illustrated in FIG. 12, lens icons 181-1 through 181-4 are displayed. In the case where there is no need to distinguish the lens icons 181-1 through 181-4 from one other for explanation purposes, they are referred to as the lens icons 181.

The lens icons 181-1 through 181-4 correspond to lenses that are different from each other. Each lens icon 181 is assigned mutually different lens parameter values. For example, if the user selects one of the lens icons 181, the lens corresponding to the selected lens icon 181 is selected (set) as the target for emulation. That is, the lens parameter values corresponding to the selected lens icon 181 are set.

The lens is then emulated by use of the set parameters, the aberrations of the lens are set, and the light focusing process is carried out accordingly. The result of the light focusing process (i.e., captured image) is displayed in the captured image display section 110. In such a manner, the application program can emulate the lens corresponding to the selected lens con 181.

Emulating a lens requires setting numerous parameters. When the icon of the desired lens is selected as described above, the user or the like can emulate the lens more easily.

In particular, the lens parameters associated with the lens icons 181 include the parameters for designating the aberrations. When the user or the like selects one lens icon. 181, the corresponding aberrations are designated.

In addition, the lens icon display section 171 displays the lens icons 181 corresponding to the candidate lenses targeted for emulation as described above. That is, the lens icon display section 171 displays a list of the lenses as the candidates for emulation. Thus, by referencing the lens icon display section 171, the user or the like can readily recognize the emulation target candidates.

Incidentally, the lens icons 181-1 through 181-3 are icons that correspond to the lenses prepared beforehand, i.e., icons corresponding to the lenses (preset lenses) with their lens parameters set in advance (i.e., test tens). That is, even if the user or the like does not create any lens icons, the lens icon display section 171 may display the lens icons 181 corresponding to such lenses prepared beforehand. This allows the user or the like to select the lens targeted for emulation with no need to deal with cumbersome tasks such as generation of lens icons.

By contrast, the lens icon 181-4 is an icon that corresponds to the lens generated by the user: or the like, i.e., an icon (user setting) corresponding to the lens of which the lens parameters have been set by the user or the like. That is, the lens icon display section 171 may display lens icons 181 corresponding to the lenses generated by the user or the like as described above. This enables the user or the like to select lenses with more diverse specifications targeted for emulation.

Preferably, the user or the like may be allowed to select the object to be focused on by dragging one lens icon 181 and dropping it into the captured image display section 110.

For example, when the user or the like drags a lens icon. 181 displayed in the lens icon display section 171 and drops it into the captured image display section 110, the lens corresponding to the dragged and dropped lens icon 181 is set as the lens targeted for emulation. Moreover, the position into which the dragged lens con 181 is moved and dropped within the captured image displayed in the captured image display section 110 is set as the position to be focused on. That is, the lens is emulated and its aberrations are set by use of the lens parameters corresponding to the dragged and dropped lens icon 181. The light focusing process is then performed in such a manner as to focus on the position into which the lens icon 181 is dropped. The result of the light focusing process (i.e., captured image) is displayed in the captured image display section 110. In such a manner, the user can more easily set not only the lens targeted for emulation but also the position to be focused on.

It is to be noted that the position to be focused on may be a region including multiple pixels centering on the position into which the icon is dropped. As another alternative, the object that is present at the position into which the icon is dropped may be recognized as an image, and the recognized object may then be focused on. It is to be noted that the number of the lens icons 181 displayed in the lens icon display section 171 may be any number and that the example in FIG. 12 is not imitative of the number of the lens icons 181 that may be displayed.

The add button 172 is a GUI button for adding a new lens icon 181 to the lens icon display section 171. When the user or the like, for example, operates the add button 172, generated is a lens icon 181 with which the lens parameters set in the lens setting section. 122, to be discussed later, are associated. The additionally generated lens icon 181 is displayed in the lens icon display section 171. That is, a new lens icon 181 is added to the lens icon display section 171.

The delete button 173 is a GUI button for deleting the lens icons 181 displayed in the lens icon display section 171. When the user or the like, for example, operates the delete button 173, the lens icon 181 selected by the user or the like from among those displayed in the lens icon display section 171 is deleted. This disables selection of the lens corresponding to the deleted lens icon 181 as the target for emulation. It is to be noted that the lens icons 181 that can be deleted may be limited to those added by the user or the like. In other words, the preset lens icons 181 may be prevented from being deleted.

The process result saving section 174 includes GUIs for setting information with respect to saving the result of emulation (result of the light focusing process), i.e., saving the virtual captured image displayed in the captured image display section 110. For example, the process result saving section 174 includes an image quality selection section 191, a save button 192, and a focus range setting section 193. The image quality selection section 191 is a GUI for the user to select the image quality (resolution) with which to save the virtual captured image. For example, the image quality selection section 191 may include a radio button with options "normal image quality" and "low image quality." By operating the image quality selection section 191, the user can select the image quality (resolution) with which to save the virtual captured image. That is, the virtual captured image is saved with the image quality (resolution) selected by the user.

As described above, the resolution-reduced multi-view image can be used for lens emulation in order to reduce load. In that case, the virtual captured image displayed in the captured image display section 110 has a resolution lower than that of the captured image. By operating the image quality selection section 191, the user has a choice of saving the virtual captured image either with the resolution at the time of emulation or with a resolution equivalent to that of the original multi-view image.

For example, when the user selects "low image quality," the virtual captured image is saved with the resolution used at the time of lens emulation. That is, the virtual captured image (result of emulation) displayed in the captured image display section 110 is saved with its image quality unchanged. Consequently, in this case, the virtual captured image is saved at a lower load. (at a higher speed).

By contrast, when the user selects "normal image quality," the virtual captured image is saved with a resolution equivalent to that of the original multi-view image. In this case, the emulation is reproduced by use of the original multi-view image. That is, a virtual captured image similar to the one displayed in the captured image display section 110 with the exception of the resolution is generated and saved (i.e., a virtual captured image equivalent to the one with its resolution enhanced from the virtual captured image displayed in the captured image display section 110).

It is to be noted that, here, what is indicated as an example of the options of image quality (resolution) at the time of saving are two kinds: the resolution at the time of emulation (low image quality); and a resolution equivalent to that of the original multi-view image (normal image quality). However, this example is not limitative of the image quality (resolution) options that may be selected as desired. For example, it is possible to save the virtual captured image with a resolution. (image quality) lower (lower image quality) than that of the original multi-view image but higher (higher image quality) than that at the time of emulation. Alternatively, the virtual captured image may be saved with a resolution lower (lower image quality) than that at the time of emulation. That is, the virtual captured image may be saved with the desired resolution (image quality).

It is to be noted that, as another alternative, the resolution (image quality) of the virtual captured image may be converted to a desired resolution (image quality) at the time of saving. Whereas the above explanation has been made regarding the virtual captured image, the depth image can also be saved with the desired resolution. (image quality).

The save button 192 is a GUI button for executing saving. For example, when, the user or the like operates the save button 192, the virtual captured image (result of the light focusing process) displayed in the captured image display section 110 is saved onto a storage medium, for example, with the image quality selected by the image quality selection section 191. In addition, the focus range setting section 193 is a GUI for inputting information designating a focal point distance.

<Lens Setting Section>

Figure 13:
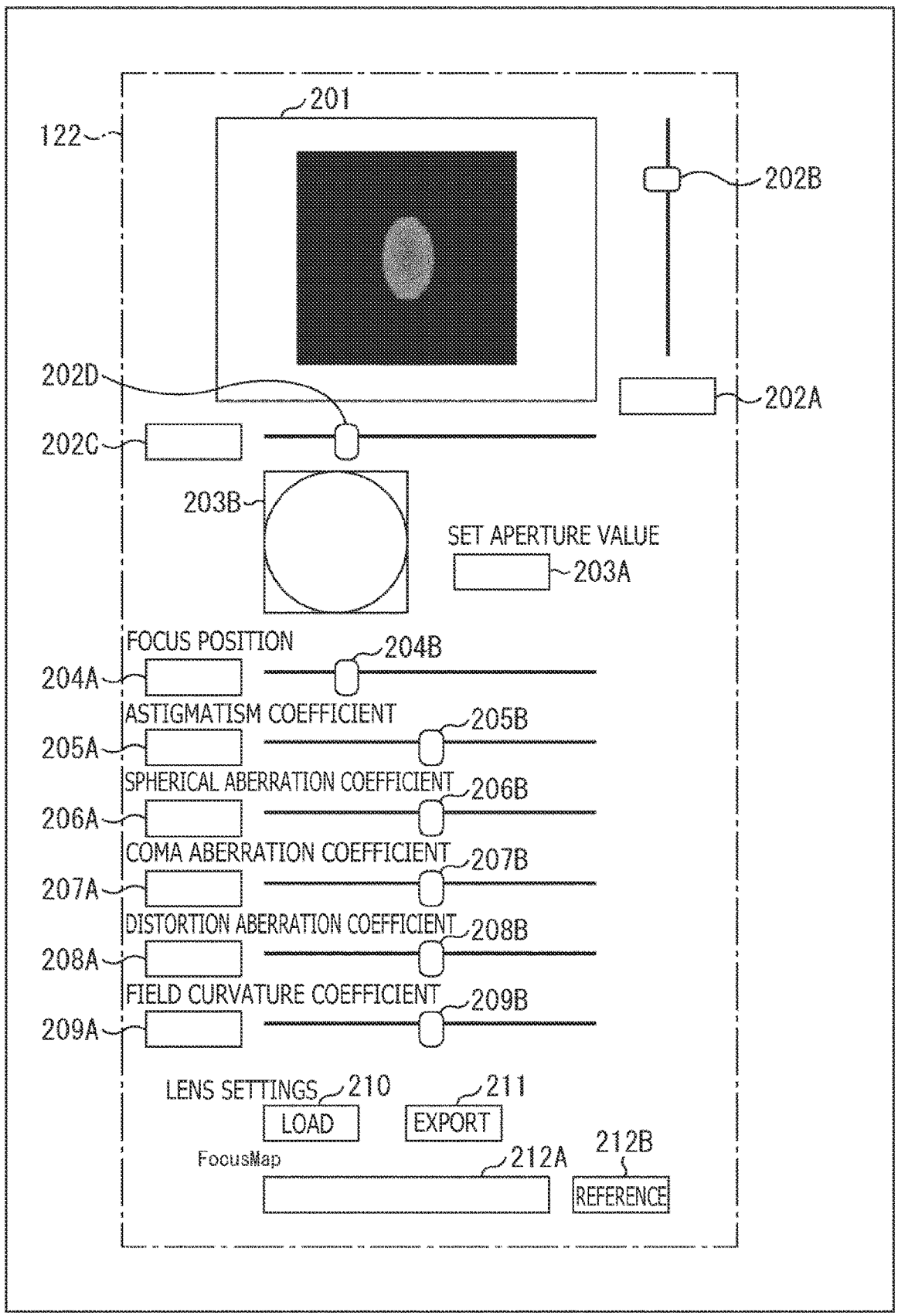
FIG. 13 is a diagram depicting an exemplary lens setting section.

FIG. 13 depicts an example of the lens setting section 122. The lens setting section 122 is a GUI for setting (customizing) lens parameters. The information input through the lens setting section 122 is accepted by the application program, for use in lens emulation.

The lens setting section 122 includes a simplified lens emulation result display section 201, an image height input field 202A, as image height setting slide bar 202B, a focus position input field 202C, and a focus position setting slide bar 202D.

The simplified lens emulation result display section 201 displays a virtual captured image representing the result of the light focusing process with a point light source taken as the object. For example, in a case where the point light source positioned at a horizontal image height set by use of the image height input field 202A or by the image height setting slide bar 202 is at a distance from a focal plane set by use of the focus position input field 2020 or by the focus position setting slide bar 202D, the simplified lens emulation result display section 201 displays a resulting blur in real time. This allows the user or the like to visually (intuitively) understand the effects of various aberrations designated by use of GUIs, to be discussed later.

The lens setting section 122 includes, as GUIs for making aperture-related settings, an aperture input field 203A for inputting an aperture value in the lens and an aperture display section 203B for displaying what the set aperture looks like. The lens setting section 122 also includes, as GUIs for making settings related to the focus position, a focus position input field 204A for numerically inputting the focus position of the lens and a focus position slide bar 204B for setting the focus position by the knob position.

The lens setting section 122 further includes GUIs for making aberration-related settings. For example, the lens setting section 122 includes a GUI for setting astigmatism, a GUI for setting spherical aberration, a GUI for setting coma aberration, a GUI for setting distortion aberration, and a GUI for setting field curvature, as the GUIs described above.

For example, the lens setting section 122 includes, as the GUI for setting astigmatism, an astigmatism coefficient input field 205A for numerically inputting an astigmatism coefficient and an astigmatism coefficient slide bar 205B for setting the astigmatism coefficient by the knob position. Also, the lens setting section 122 includes, as the GUI for setting spherical aberration, a spherical aberration coefficient input field 206A for numerically inputting a spherical aberration coefficient and a spherical aberration coefficient slide bar 206B for setting the spherical aberration coefficient by the knob position, for example. Further, the lens setting section 122 includes, as the GUI for setting coma aberration, a coma aberration coefficient input field 207A for numerically inputting a coma aberration coefficient and a coma aberration coefficient slide bar 207B for setting the coma aberration coefficient by the knob position, for example. In addition, the lens setting section 122 includes, as the GUI for setting distortion aberration, a distortion aberration coefficient input field 208A for numerically inputting a distortion aberration coefficient and a distortion aberration coefficient slide bar 208B for setting the distortion aberration coefficient by the knob position, for example. Also, the lens setting section 122 includes, as the GUI for setting field curvature, a field curvature coefficient input field 209A for numerically inputting a fieldcurvature coefficient and a field curvature coefficient slide bar 209B for setting the field curvature coefficient by the knob position, for example.

Incidentally, these aberrations are called Seidel's five aberrations.

The lens setting section 122 also includes a load button 210 as a GUI button operated by the user to load lens settings from a predetermined file and an export button 211 as a GUI button operated by the user to export lens settings to the predetermined file.

The lens setting section 122 further includes a focus map input field 212A for designating an external focus map in the case where it is used and a reference button 212B. The focus map signifies map information in which parallax information is registered for each captured image pixel (i.e., for its position).

The user or the like may operate the above-described GUIs to change at least one of the settings related to aperture, focus position, and aberrations. In the case where such changes occur, the light focusing process is performed instantaneously (in real time) and the result of the process (i.e., virtual captured image) is displayed concurrently in the captured image display section 110 in a manner reflecting the changed parameters.

As a result, lens emulation can be carried out more easily.

<Other-image combination process>

Figure 14:
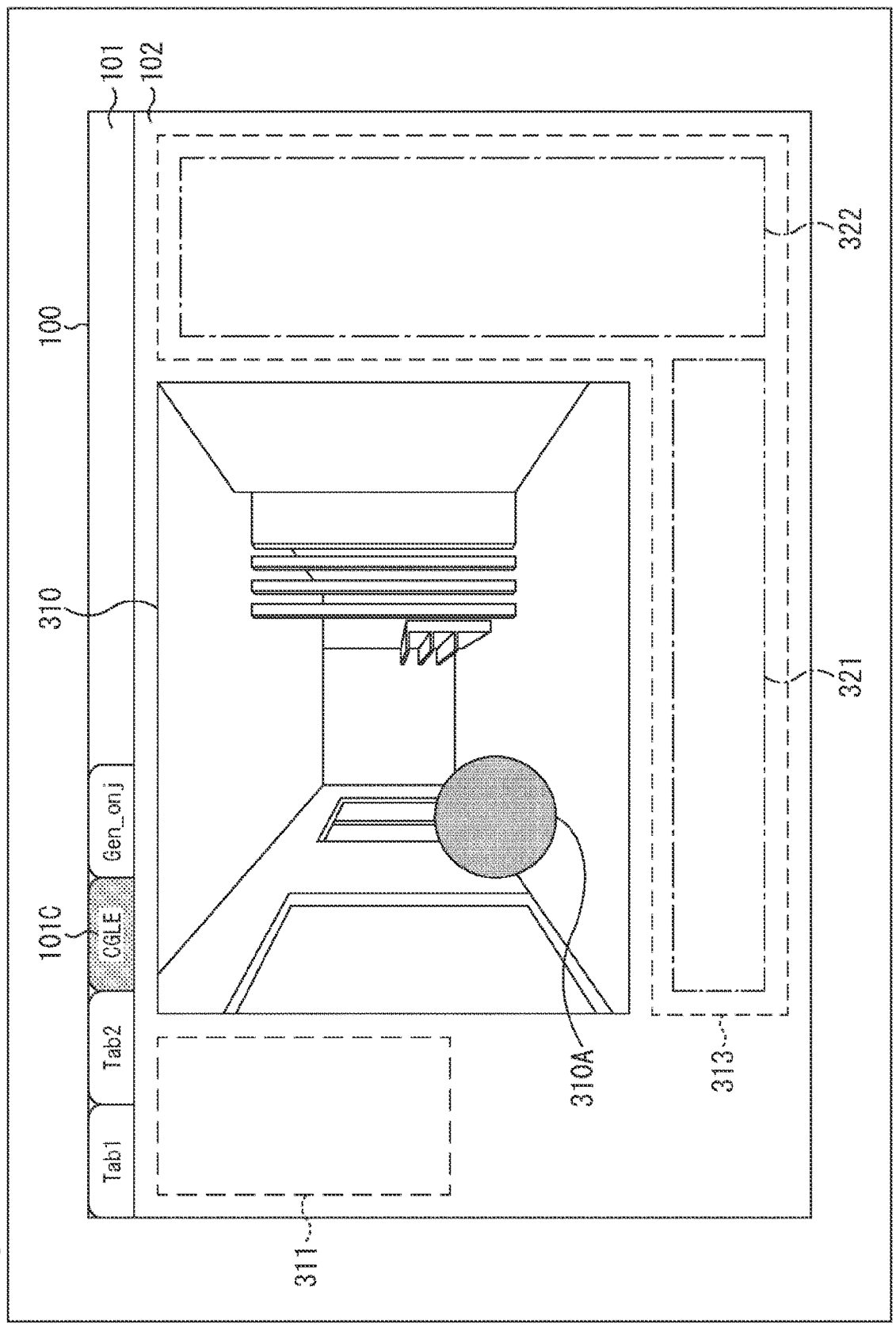
FIG. 14 is a diagram depicting another exemplary development screen.

An other-image combination process may be performed to combine the virtual captured image resulting from the light focusing process with a combination target image, which is some other image such as a CG image. In this case, a combination process (depth-handling combination process) may be carried out in such a manner as to add up the depth data set for the combination target image and the depth data regarding the virtual captured image. FIG. 14 depicts an example of the development screen 100 in the case where the other-image combination process as described above is conducted. For example, when the user or the like selects the tab 101C in the tab display section 101 on the development screen 100, the GUT display section 102 is caused to display an other-image combination process GUI corresponding to the selected tab 101C.

As depicted in FIG. 14, this GUI includes a composite image display section 310, an input/output setting section. 311, and a lens emulation section 313. In addition, the lens emulation section 313 includes a lens selection section 321 and a lens setting section 322.

The composite image display section 310 displays a composite image that combines the combination target image with the captured image (virtual captured image) obtained by image capture through the emulated lens and Generated by the light focusing process. Further, in the composite image display section 310, the user or the like may work on combining the combination target image with the virtual captured image.

As with the captured image display section 110, the composite image display section. 310 may display the virtual captured image resulting from the light focusing process. The user or the like can thus work on combining a combination target image 310A with the virtual captured image.

It is to be noted that, as in the case of the captured image display section 110, the composite image display section 310 may display the virtual captured image with a resolution lower than that of the original multi-view image obtained by actual image capture. This makes it possible to suppress increase in load caused by the light focusing process, display of the result thereof, and combination with the combination target image, for example. Consequently, it is possible to perform such processes as the light focusing process, display of the result thereof, and display of the composite image at higher speed without higher cost being incurred. It is to be noted that, naturally, the composite image display section 310 may also display the virtual captured image with a resolution equivalent to that of the original multi-view image. That is, the original multi-view image may be used in the light focusing process, and the virtual captured image with a resolution equivalent to that of the original multi-view image may be acquired, as a result of the light focusing process.

<Input/Output Setting Section>

Figure 15:
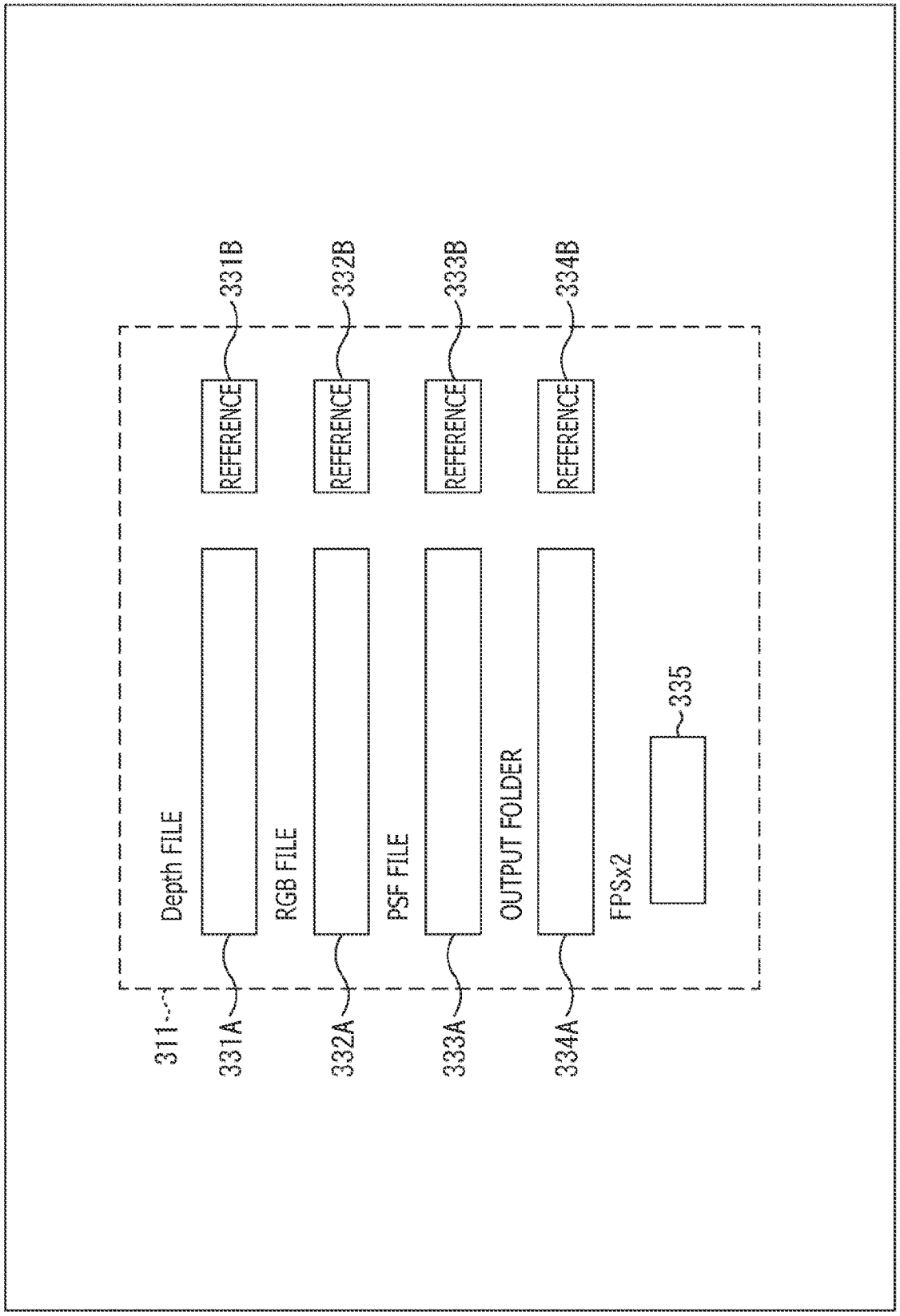
FIG. 15 is a diagram depicting another exemplary input/output setting section.

As with the input/output setting section 111, the input/output setting section 311 is a GUI for inputting information related to input/output settings. The information input through the input/output setting section 311 is accepted by the application program, for use in making input/output settings. An example of the input/output setting section 311 is depicted in FIG. 15.

For example, the input/output setting section 311 includes a depth file designation field 331A and a reference button 331B as a GUI for designating a depth file including depth data. For example, the user or the like activates a file management GUI either by inputting a file name and an address to the depth file designation field 331A or by operating the reference button 331B, and, using the file management GUI, designates the depth file to be input.

The input/output setting section 311 also includes an RGB file designation field 332A and a reference button 332B as a GUI for designating an RGB file including an RGB image. For example, the user or the like activates a file management GUI either by inputting a file name and an address to the RGB file designation field 332A or by operating the reference button. 332B, and, using the activated file management GUI, designates the RGB file to be input.

It is to be noted that the RGB file is what is generally called a captured image (RAW image) corresponding to the RGB data including the pixel values of R, G, and B pixels. By contrast, the depth image is the depth data corresponding to an RGB image and being imaged by colors being assigned to the depth values. In other words, the depth image is map information that represents in pixel colors (pixel values) the distance (depth value) from each of the pixels in the RGB image to the object.

It is to be noted that the RGB image may not be a Bayer array RAW image. In addition, the color space in the captured image is not limited to anything specific and may not be an RGB image. For example, the color space may be a YUV, YChCr, or YP-bPr image or the like. Furthermore, the captured image may not be a color image. For example, the captured image may be a single-color image such as a monochromatic image or a sepia-tone image. That is, the RGB image may be any image that takes the form of an image.

The input/output setting section 311 further includes, as a GUI for designating a PSF (Point Spread Function) file including information related to a point spread function, a PSF file designation field 333A and a reference button 333B. For example, the user or the like activates a file management GUI either by inputting a file name and an address to the PSF file designation field. 333A or by operating the reference button. 333B, and, using the activated file management GUI, designates the PSF file to be input.

The input/output setting section 311 also includes, as a GUI for designating the folder to which to output a file of the composite image resulting from the other-image combination process, an output folder designation field 334A and a reference button 334B. For example, the user or the like activates a file management GUI either by inputting a folder name and an address to the output folder designation field 334A or by operating the reference button 334B and, using the activated file management. GUI, designates the folder to which to output the composite image file. The input/output setting section 311 further includes an FPSx2 input field 335 to which to input a frame rate.

<Lens Selection Section>

Described with reference to FIG. 14 again, the lens emulation section 313 is a GUI related to lens emulation. In the lens emulation section 313, the lens selection section 321 is a GUI related to selecting the lens targeted for emulation. An example of the lens selection section 321 is depicted in FIG. 16.

Figure 16:
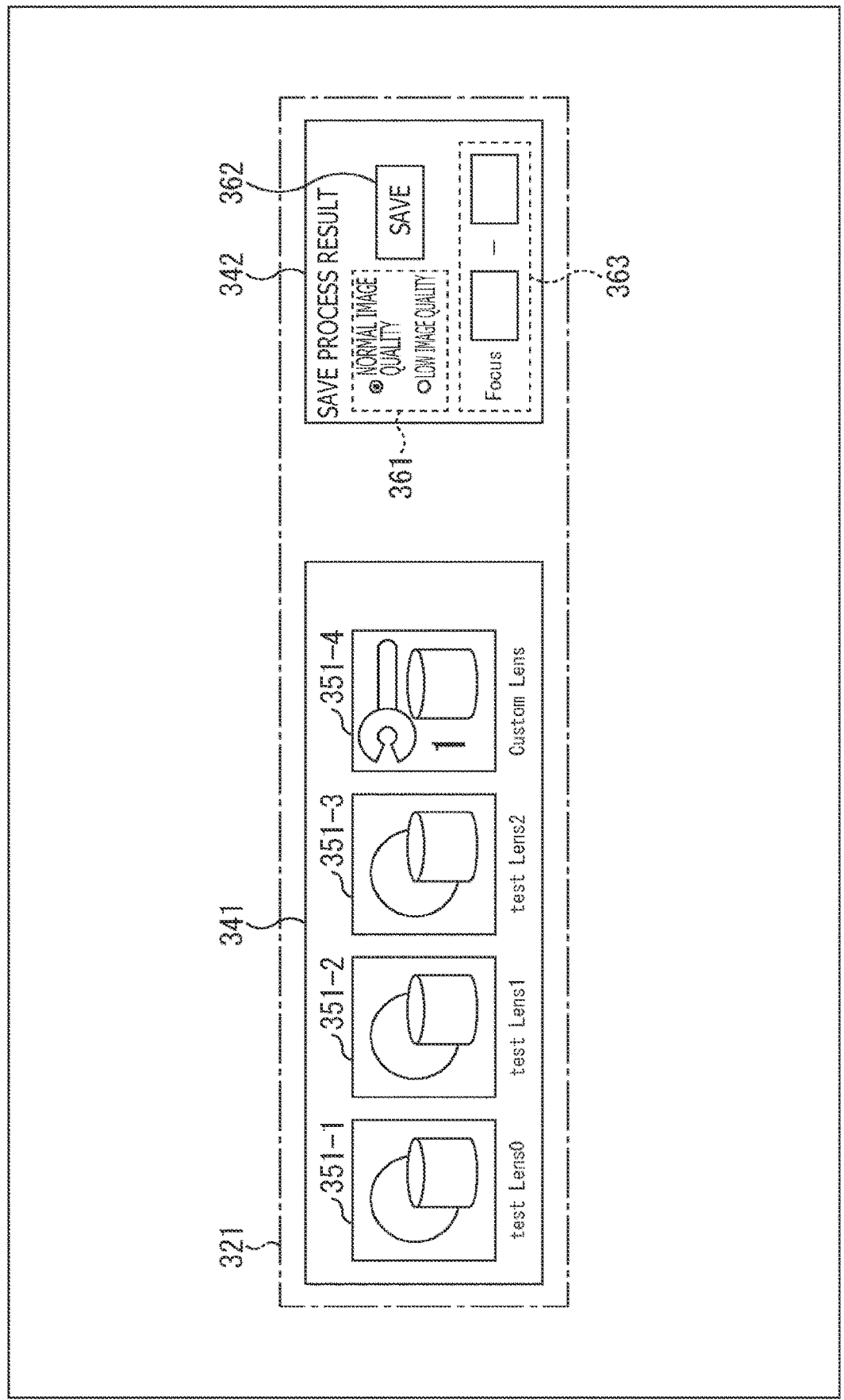
FIG. 16 is a diagram depicting another exemplary lens selection section.

As depicted in FIG. 16, the lens selection section 321 includes a lens icon display section 341 and a process result saving section 342, for example. As with the lens icon display section 171, the lens icon display section 341 is a GUI for selecting the lens targeted for emulation, and displays icons corresponding to the lenses as candidates targeted for emulation. In the example of FIG. 16, lens icons 351-1 through 351-4 are displayed. In the case where there is no need to distinguish the lens icons 351-1 through 351-4 from one another for explanation purposes, they are referred to as the lens icons 351.

The lens icons 351-1 through 351-4 are similar to the lens icons 181-1 through 181-4, respectively. As in the case of the lens icon display section 171, when the user selects one of the lens icons 351, for example, the lens corresponding to the selected lens icon 351 is selected (set) as the target for emulation. That is, the lens parameter values corresponding to the selected lens icon 351 are set. In addition, the lens is emulated by use of the set parameters, the aberrations of the lens are set, and the light focusing process is carried out accordingly. The result of the light focusing process (captured image) is displayed in the composite image display section 310.

That is, the user or the like can also emulate the lens more easily when using the other-image combination process GUI corresponding to the tab 1010. In particular, the lens parameters associated with the lens icons 351 include parameters for designating aberrations. By selecting the lens icons 181, the user or the like can designate the relevant aberrations.

In addition, the lens icon display section 341 displays the lens icons 351 corresponding to the lenses as candidates targeted for emulation, as described above. Thus, by referencing the lens icon display section. 341, the user or the like can easily recognize the emulation target candidates.

It is to be noted that the lens icons 351-1 through 351-3 are icons corresponding to previously furnished lenses, i.e., icons corresponding to the lenses (test Lens) with their lens parameters prepared beforehand (i.e., preset lens icons). This allows the user or the like to select the lens targeted for emulation with no need to deal with cumbersome tasks such as generation of lens icons.

By contrast, the lens icon 351-4 is an icon that corresponds to the lens generated by the user or the like, i.e., an icon (user setting) corresponding to the lens of which the lens parameters have been set by the user or the like. This enables the user or the like to select lenses with more diverse specifications targeted for emulation.

In addition, as in the case of the lens icon display section 171, the user or the like can preferably select the object to be focused on, by dragging one of the lens icons 351 displayed in the lens icon display section 341 and dropping it into the composite image display section 310. That is, the lens may be emulated and its aberrations set by use of the lens parameters corresponding to the dragged and dropped lens icon 351. The light focusing process may then be performed in a manner focusing on the object positioned at the destination to which the lens icon 351 has been moved. The result of the light focusing process (captured image) may be displayed in the composite image display section 310.

It is to be noted that the number of the lens icons 351 displayed in the lens icon display section 341 may be any number and that the example in FIG. 16 is not limitative of the number of the lens icons 351 that may be displayed.

The process result saving section 342 is a GUI similar to the process result saving section 174. The process result saving section 342 includes an image quality selection section 361, a save button 362, and a focus range setting section 363. The image quality selection section 361 is a GUI similar to the image quality selection section 191. The save button 362 is a GUT similar to the save button 192. The focus range setting section 363 is a GUI similar to the focus range setting section 193.

<Lens Setting Section>.

Described with reference to FIG. 14 again, the lens setting section 322 is a GUI for setting (customizing) lens parameters. The information input through the lens setting section 322 is accepted by the application program, for use in lens emulation. An example of the lens setting section 322 is depicted in FIG. 17.

Figure 17:
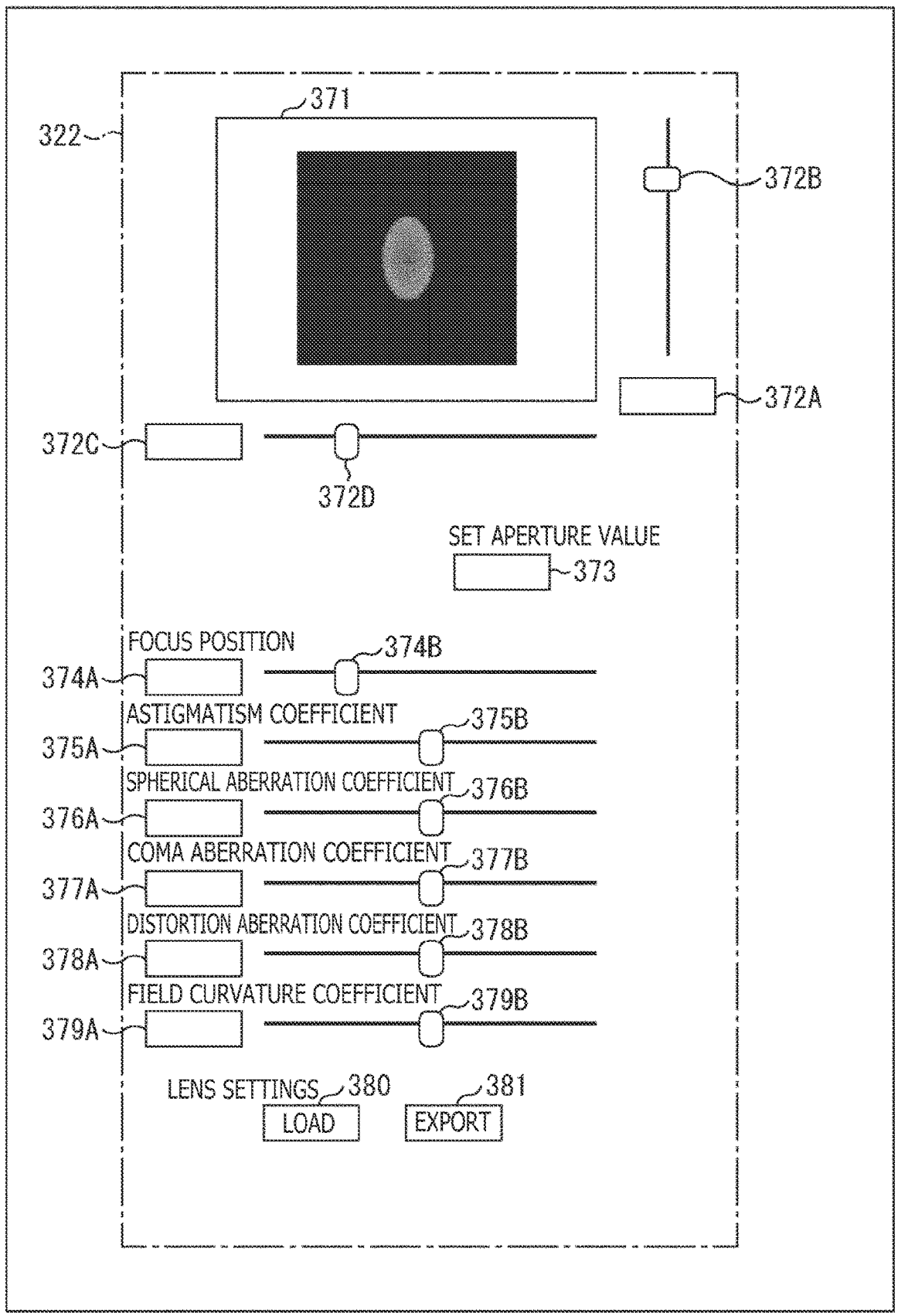
FIG. 17 is a diagram depicting another exemplary lens setting section.

As depicted in FIG. 17, the lens setting section. 322 includes a simplified lens emulation result display section 371, an image height input field 372A, an image height setting slide bar 372B, a focus position input field 372C, and a focus position setting slide bar 372D. The simplified lens emulation result display section 371 is a GUI similar to the simplified lens emulation result display section 201. The image height input field 372A is a GUI similar to the image height input field 202A. The image height setting slide bar 372B is a GUI similar to the image height setting slide bar 2025. The focus position input field 372C is a GUI similar to the focus position input field 202C. The focus position setting slide bar 372D is a GUI similar to the focus position setting slide bar 202D.

The lens setting section 322 also includes an aperture input field 373 as a GUI for making aperture-related settings. The aperture input field 373 is a GUI similar to the aperture input field 203A. The lens setting section 322 also includes, as a GUI for making settings related to the focus position, a focus position input field 374A and a focus position slide bar 374B for setting the focus position by the knob position. The focus position input field 374A is a GUI similar to the focus position input field. 204A. The focus position slide bar 374B is a GUI similar to the focus position slide bar 204B.

The lens setting section 422 also includes GUIs for making aberration-related settings. For example, the lens setting section 322 includes a GUI for setting astigmatism, a GUI for setting spherical aberration, a GUI for setting coma aberration, a GUI for setting distortion aberration, and a GUI for setting field curvature, as the GUIs described above.

For example, the lens setting section 322 includes, as GUIs for setting astigmatism, an astigmatism coefficient input field 375A and an astigmatism coefficient slide bar 375B. The astigmatism coefficient input field. 375A is a GUI similar to the astigmatism coefficient input field 205A. The astigmatism coefficient slide bar 375B is a GUI similar to the astigmatism coefficient slide bar 205B.

The lens setting section 322 further includes, as GUIs for setting spherical aberration, a spherical aberration coefficient input field 376A and a spherical aberration coefficient slide bar 376B, for example. The spherical aberration coefficient input field 376A is a GUI similar to the spherical aberration coefficient input field 206A. The spherical aberration coefficient slide bar 376B is a GUI similar to the spherical aberration coefficient slide bar 206B.

The lens setting section. 322 also includes, as GUIs for setting coma aberration, a coma aberration coefficient input field 377A and a coma aberration coefficient slide bar 377B, for example. The coma aberration coefficient input field 377A is a GUI similar to the coma aberration coefficient input field 207A. The coma aberration coefficient slide bar 377B is a GUI similar to the coma aberration coefficient slide bar 207B.

The lens setting section 322 further includes, as GUIs for setting distortion aberration, a distortion aberration coefficient input field 378A and a distortion aberration coefficient slide bar 378B, for example. The distortion aberration coefficient input field 378A is a GUI similar to the distortion aberration coefficient input field 206A. The distortion aberration coefficient slide bar 378E is a GUI similar to the distortion aberration coefficient slide bar 208B.

The lens setting section 322 also includes, as GUIs for setting field curvature, a field curvature coefficient input field 379A and a field curvature coefficient slide bar 379B, for example. The field curvature coefficient input field 379A is a GUT similar to the field curvature coefficient input field 2092. The field curvature coefficient slide bar 209B is a GUI similar to the field curvature coefficient slide bar 209B.

The lens setting section 322 further includes a load button 380 and an export button 381. The load button 380 is a GUI similar to the load button 210. The export button. 381 is a GUI similar to the export button 211.

<Other-Image Combination Work>

As described above, the user or the like can perform the work of combining the combination target image with the captured image displayed in the composite image display section 310 (the work is also referred to as the other-image combination work). The other-image combination work is carried out preferably after depth processing is carried out on the captured image, for example.

Figure 18:
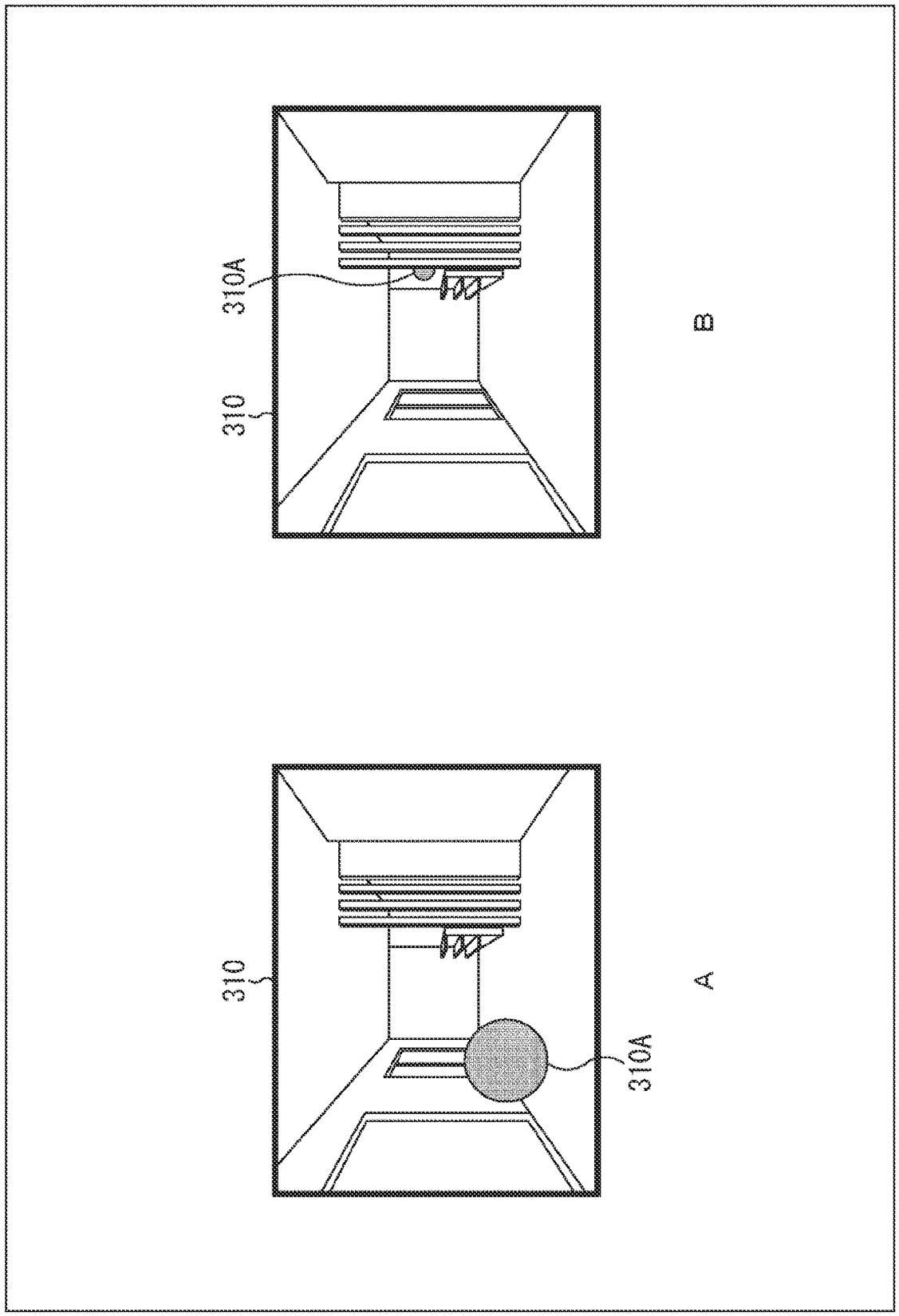
FIG. 18 depicts diagram illustrating other exemplary composite images.

For example, the user or the like determines the position in x and y coordinates of the combination target image to be combined (e.g., CG (Computer Graphics) image) in a drag-and-drop operation. While being dragged, the combination target image as a whole is being displayed. When dropped, the combination target image is displayed in a manner reflecting occlusion with the captured image. For example, in the case where the combination target image 310A is in the foreground as depicted in Subfigure A of FIG. 18, the combination target image 310A is displayed in preference to the captured image (i.e., the captured image is displayed such that the portion of the captured image overlapping with the combination target image 310A appears hidden behind the latter). In the case where the combination target image 310A is in the background as depicted in Subfigure B in FIG. 18, the captured image is displayed in preference to the combination target image 310A (i.e., the captured image is displayed such that the portion of the combination target image 310A overlapping with the captured image appears hidden behind the latter).

While selecting the combination target image, the user or the like determines the depth position of the combination target image by operating a mouse wheel, for example. The size of the combination target image may be controlled according to the depth position. In addition, the combination target image is not limited in type and may be a CG image or a captured image. Further, the number of the combination target images to be combined with the captured image may be any number. Furthermore, lens emulation may also be carried out in a composite space.

2. First Embodiment

<Computer>

Figure 19:
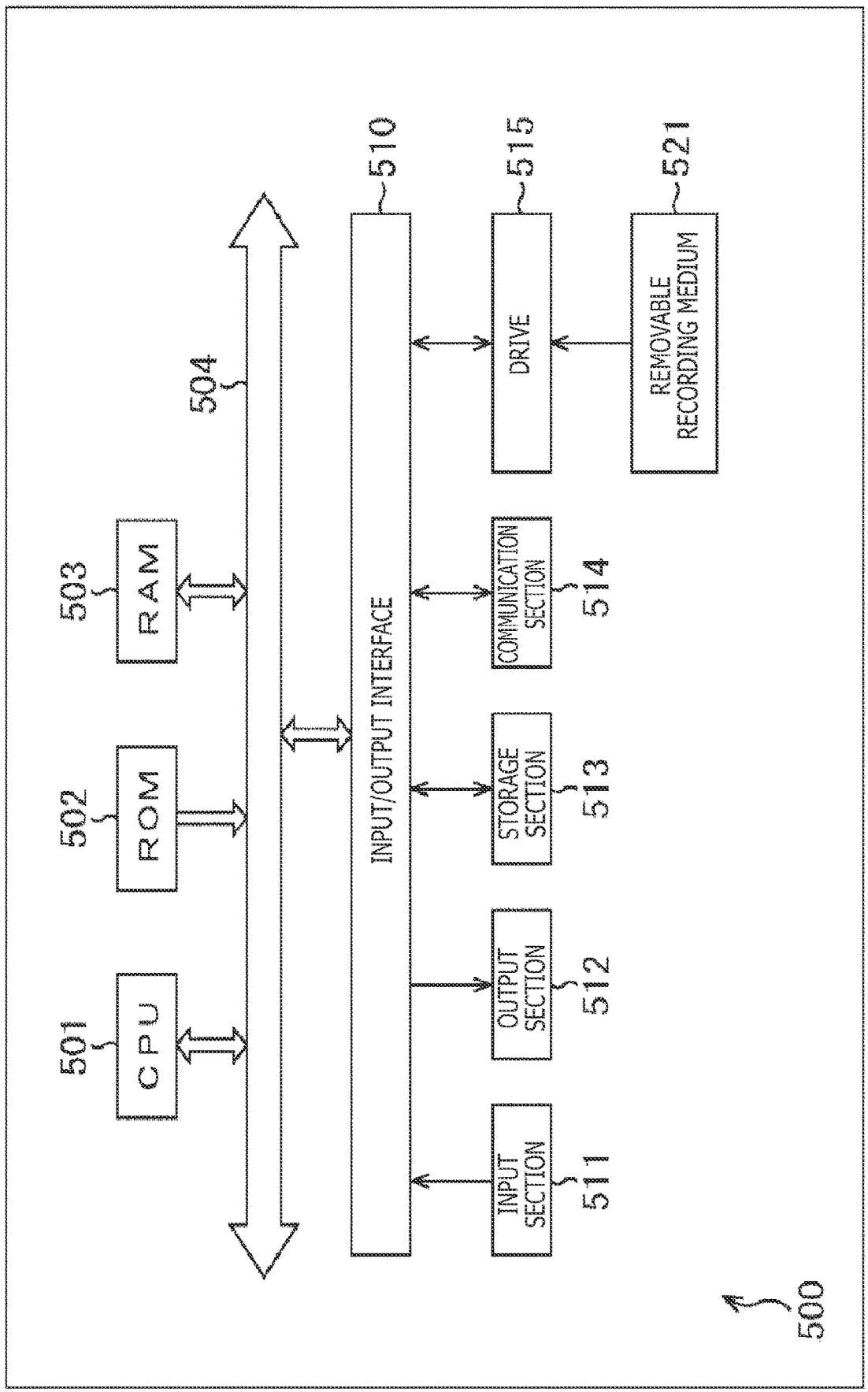
FIG. 19 is a block diagram depicting an exemplary principal configuration of a computer.

Explained next are the devices for executing the above-described application program. FIG. 19 depicts a main configuration example of a computer embodying an image processing apparatus to which the present technology is applied. A computer 500 illustrated in FIG. 19 is an apparatus that executes the application program. (software) installed therein to perform the above-described lens emulation and other-image combination process by use of the multi-view image. Variations of the computer in this case include one built in dedicated hardware and a general-purpose personal computer or like equipment capable of executing diverse functions according to the various programs installed therein. In executing the application program, the computer 500 accepts selection of the lens targeted for emulation by use of the GUIs (on the development screen 100) discussed above in the paragraphs of "1. Lens emulation." The computer 500 generates an aberration table as a table including the converging ray vectors derived from the aberrations of the selected lens, and uses the aberration table to perform the light focusing process in which to Generate the captured image taken of the object through the selected lens. In such a manner, the work to be performed by the user to set aberration-related parameters is reduced more or less to the work of lens selection. Lens emulation is thus carried out more easily.

It is to be noted that the major processing sections and principal data flows depicted in FIG. 19 are not exhaustive. That is, the computer 500 may also include processing sections not illustrated as blocks in FIG. 19 as well as processes and data flows not indicated by arrows is the figure.

In FIG. 19, the computer 500 has a CPU (Central Processing Unit) 501, a ROM (Read Only Memory) 502, and a RAM (Random Access Memory) 503 interconnected via a bus 504.

The bus 504 is also connected with an input/output interface 510. The input/output interface 510 is connected with an input section 511, an output section 512, a storage section 513, a communication section 514, and a drive 515.

The input section 511 includes a keyboard, a mouse, a microphone, a touch panel, and input terminals, for example. The output section 512 includes a display unit, speakers, and output terminals, for example. The storage section 513 includes a hard disk, a RAM disk, and a nonvolatile memory, for example. The communication section 514 includes a network interface, for example. The drive 515 drives a removable recording medium 521 such as a magnetic disk, an optical disk, a magneto-optical disk, or a semiconductor memory.

In the computer 500 configured as described above, the CPU 501 performs the abovementioned series of processing, for example, by loading the application program stored in the storage section 513 into the RAM 503 via the input/output interface 510 and the bus 504 and by executing the loaded application program. As needed, the RAM 503 may also store data necessary for the CPU 501 to carry out various processes.

The application program to be executed by the computer 500 can be recorded, for example, on the removable recording medium 521 as a packaged medium before being used. In that case, a suitable piece of the removable recording medium 521 carrying the application program can be attached to the drive 515, the application program being installed from the attached medium into the storage section 513 via the input/output interface 510.

The application program can also be offered via a wired or wireless transmission medium such as local area networks, the Internet, and digital satellite broadcasting. In that case, the application program can be received by the communication section 514 before being installed into the storage section 513.

As another alternative, the application program can be preinstalled in the ROM 502 or in the storage section 513.

Figure 20:
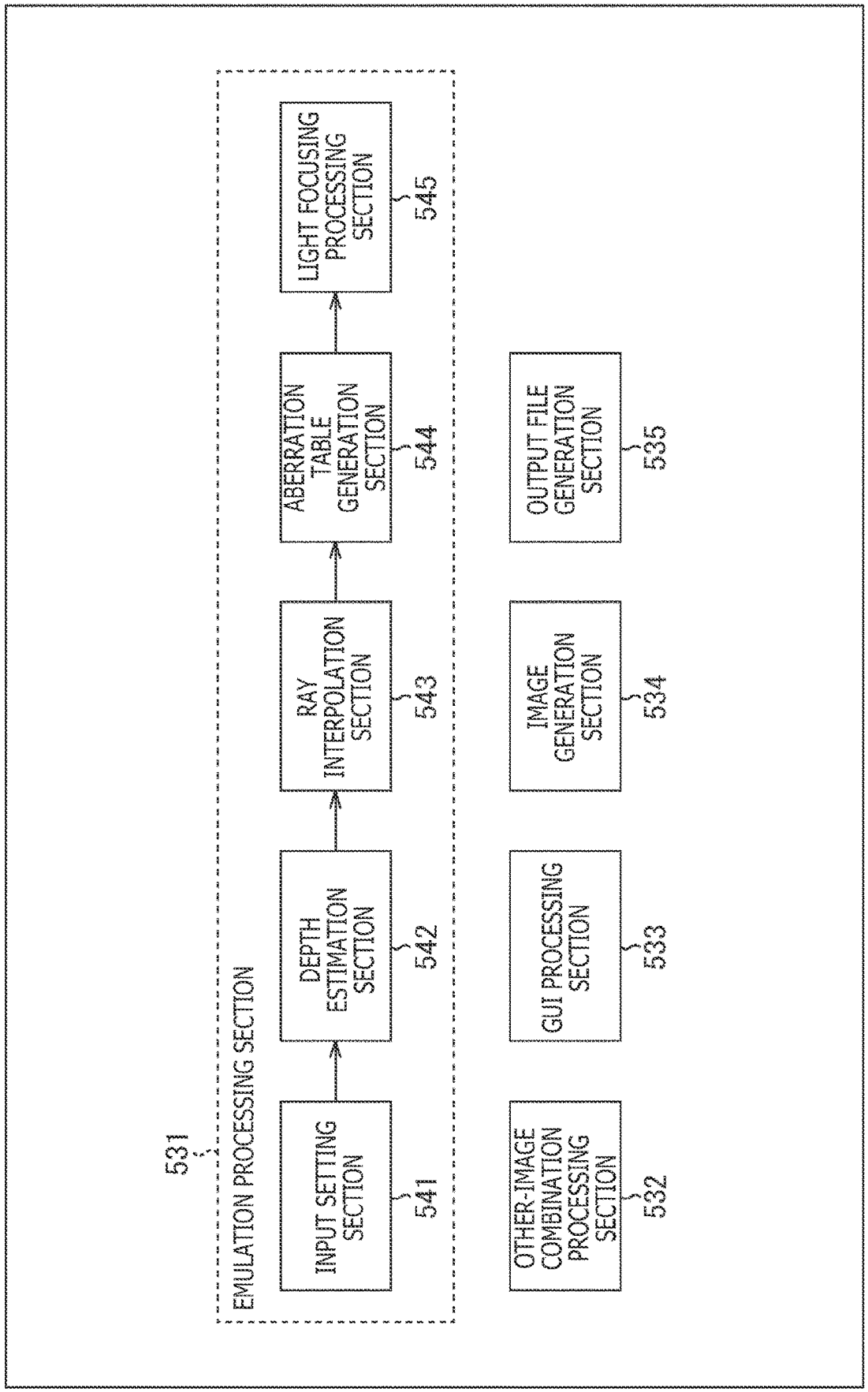
FIG. 20 is a functional block diagram depicting functions implemented by the computer.

FIG. 20 is a functional block diagram depicting, as functional blocks, the functions implemented by the computer 500 executing the application program. As depicted in FIG. 20, the computer 500 can possess such functional blocks as an emulation processing section 531, a combination processing section 532, a GUT processing section 533, an image generation section 534, and an output file generation section 535. Each of these functional blocks is explained below.

<Emulation Processing Section>

The emulation processing section 531 performs lens emulation-related processes by use of the development screen 100 illustrated in FIG. 7, for example. The emulation processing section 531 can include such functional blocks as an input/output setting section 541, a depth estimation section 542, a ray interpolation section 543, an aberration table generation section 544, and a light focusing processing section 545, for example.

The input/output setting section 541 performs, for example, processes related to input/output settings with use of GUIs such as the input/output setting sections 111 and 311. For example, when the user or the like operates the input section 511 through such GUIs as the input/output setting section 111 or 311, the input/output setting section 541 performs the process based on the operations accepted by the input section 511. For example, when the input section 511 accepts from the user or the like a file input instruction and operations to designate the input file, the input/output setting section 541 can perform the process of loading the information regarding the designated file and the like. As another example, when the input section 511 accepts from the user or the like a file output instruction and operations to designate the output folder, the input/output setting section 541 can generate files in the designated output folder. The input/output setting section 541 can make these input/output settings prior to depth estimation, for example.

The depth estimation section 542 performs, for example, processes related to depth estimation using such GUIs as the depth estimation section 112. For example, when the user or the like operates the input section 511 through such GUIs as the depth estimation section 112, the depth estimation section 542 carries out the process based on the operations accepted by the input section 511. For example, when the input section. 511 accepts from the user or the like operations to designate parameters, the depth estimation section 542 can generate depth data (or a depth map) by estimating the depth of the object from the multi-view image with use of the designated parameters. The depth estimation section 542 can perform the depth estimation prior to ray interpolation, for example.

The ray interpolation section 543 performs ray interpolation by using the multi-view image and depth data. Ray interpolation involves increasing the number of viewpoint images for use in generating the virtual captured image by generating, through an interpolation process, those viewpoint images making up the viewpoints between the viewpoint images included in the captured image. With the number of the viewpoint images thus increased, the virtual image is generated from more numerous viewpoint images including those generated by the interpolation process. This makes it possible to generate a virtual captured image with higher resolution. However, in the case where high-resolution virtual captured images are not to be generated, the processing of the ray interpolation section 543 is unnecessary. The ray interpolation section 543 can perform the ray interpolation process prior to generating the aberration table, for example.

The aberration table generation section 544 performs, for example, processes related to generating the aberration table using such GUIs as the lens selection section 121 and the lens setting section 122 on the development screen 100. For example, when the user or the like operates the input section 511 through such GUIs as the lens selection section. 121 and lens setting section 122, the aberration table generation section 544 performs the process based on the operations accepted by the input section 511. For example, when the user or the like selects the lens targeted for emulation through the lens selection section 121 or customizes the lens parameters through such GUIs as the lens setting section 122, with the operations accepted by the input section 511, the aberration table generation section 544 can generate an aberration table as a table including the converging ray vectors derived from the five aberrations, by use of the parameters of the selected lens or the customized lens parameters.

The light focusing processing section 545 can use the aberration table and the multi-view image and perform the light focusing process in order to generate the captured image (virtual captured image) taken of the object through the selected lens. It is to be noted that the light focusing processing section 545 can carry out the light focusing process by using the multi-view image with desired resolution. For example, the light focusing processing section 545 can perform the light focusing process by using a multi-view image with a resolution lower than that of the original multi-view image obtained by actual image capture, thereby generating a virtual captured image with a resolution lower than that of the original multi-view image.

Alternatively, after the depth map is finalized through depth estimation with the lens emulation section 113 enabled and with the selected lens accepted, the ray interpolation section 543 may carry out ray interpolation and hold the interpolated ray information. This makes it possible to clearly distinguish the ray interpolation process subject to a heavy load from the depth estimation process. In addition, in the case where ray interpolation is performed upon selection of the lens and where some lens parameters are changed thereafter, the virtual captured image can be obtained by simply generating the aberration table or executing the light focusing process. That is, the virtual captured image (result of the light focusing process) can be acquired at higher speed.

<Other-Image Combination Processing Section>

The other-image combination processing section 532 performs processes related to the other-image combination process using the development screen 100 (GUI for the other-image combination process corresponding to the tab 101C) depicted in FIG. 14, for example. When the user or the like operates the input section 511 through the GUI, the other-image combination processing section 532 generates a composite image by combining the combination target image with the virtual captured image generated by the light focusing process, according to the operations accepted by the input section 511.

<GUI Processing Section>

The GUI processing section 533 performs processes related to the GUIs displayed in the output section 512 (for example, on its monitor). For example, the GUI processing sect on 533 can generate a display image such as a GUI for the image generation section 534. Moreover, when the input section 511 is operated through the displayed GUI, the GUI processing section 533 can control, according to the operations accepted by the input section 511, the emulation processing section 531, the other-image combination processing section. 532, and the image generation section 534 to perform the process corresponding to the operations accepted. Further, the GUI processing section 533 can obtain the information input to the input section 511 through the displayed GUI and supply the acquired information to the emulation processing section 531, to the other-image combination processing section 532, and to the image generation section 534, for example. That is, the GUI processing section 533 can control how the input information is accepted and how image display is carried out.

<Image Generation Section>.

The image generation section 534 performs processes related to generating the display image (e.g., development screen 100). For example, the image generation section 534 generates the display image under control of the GUI processing section 503. At this point, the image generation section 534 can generate the display image by using information supplied from the GUI processing section 503 or the like, for example. The image generation section 534 can cause the development screen 100 to reflect, for example, such information as the file name and the path input to the input section 511 (i.e., the development screen 100 including the file name and the path is generated). The image generation section 534 can also cause the development screen 100 to reflect, for example, the virtual captured image generated by the light focusing processing section 545 or the composite image generated by the other-image combination processing section 532 (i.e., the development screen 100 including the virtual captured image or the composite image is generated). The image generation section 534 can further supply the generated display image to the output section 512 (for example, to its monitor) for display.

<Output File Generation Section>

The output file generation section 535 performs processes related to generating the output file. For example, the output file generation section 535 can generate the output file to which to output the virtual captured image generated by the light focusing processing section 545 or the composite image generated by the other-image combination processing section 532. The output file generation section 535 can supply the generated output file to the storage section 513 for storage, cause the communication section 514 to transmit the output file to another apparatus, or cause the drive 415 to record the output file to the removable recording medium 521. That is, the output file generation section. 535 can control the output (e.g., storage, transmission, or recording) of the output file (e.g., virtual captured image or composite image). For example, the output file generation section 535 can output (e.g., store, transmit, or record) the virtual captured image or the composite image with a resolution higher than that at the time of emulation (e.g., resolution equivalent to the resolution of the original multi-view image). Obviously, the output file generation section. 535 may also output (e.g., store, transmit, or record) the virtual captured image or the composite image with the resolution at the time of emulation. That is, the output file generation section 535 can control the resolution of the virtual captured image or of the composite image at the time of output.

By executing the application program to implement the functions indicated by the above functional blocks, the computer 500 can perform the processes discussed in the paragraphs of "1. Lens emulation," for example, and thereby provide the advantageous effects mentioned therein.

<Flow of the Lens Emulation Process>

Figure 21:
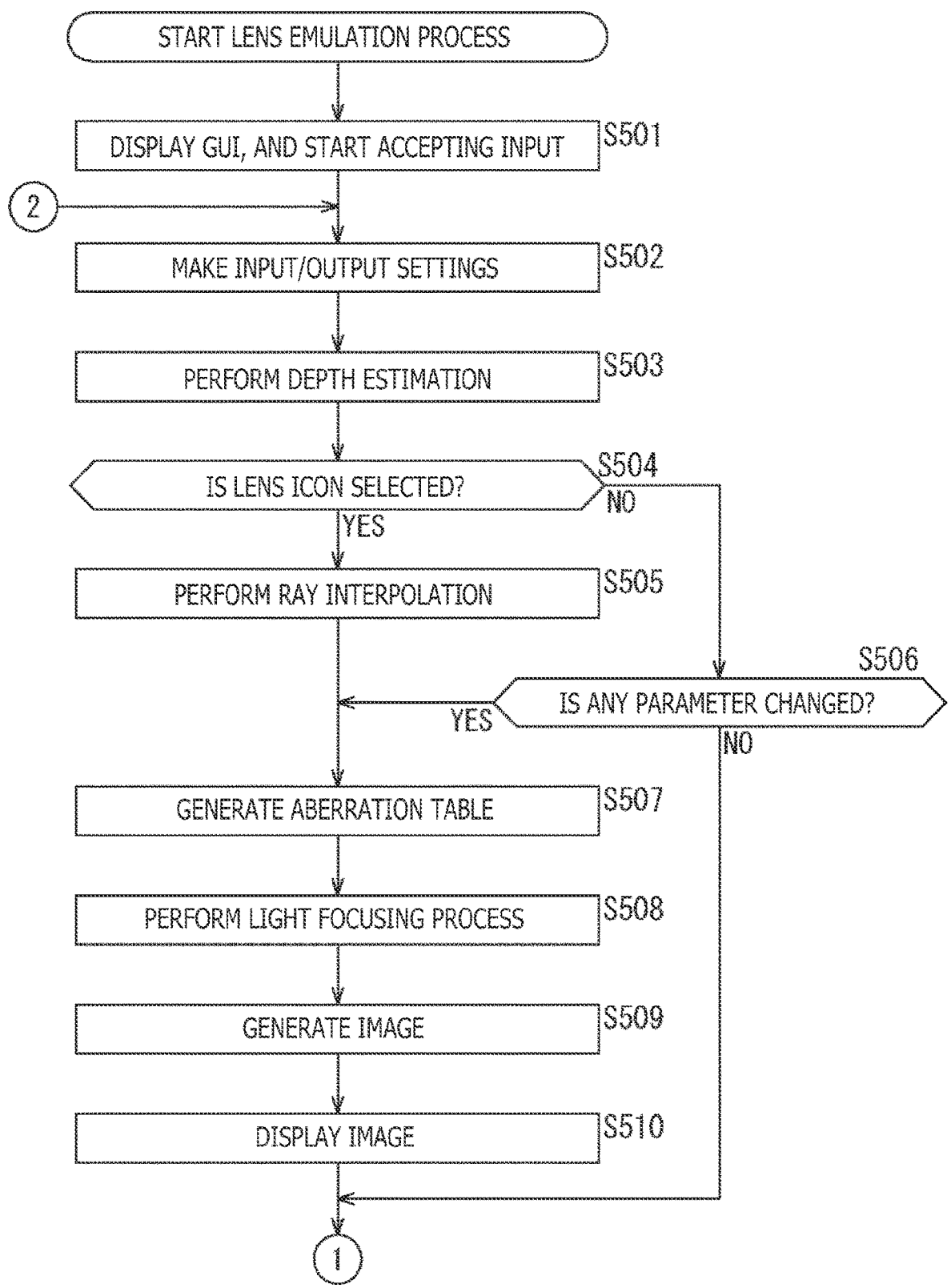
FIG. 21 is a flowchart explaining an exemplary flow of a lens emulation process.
Figure 22:
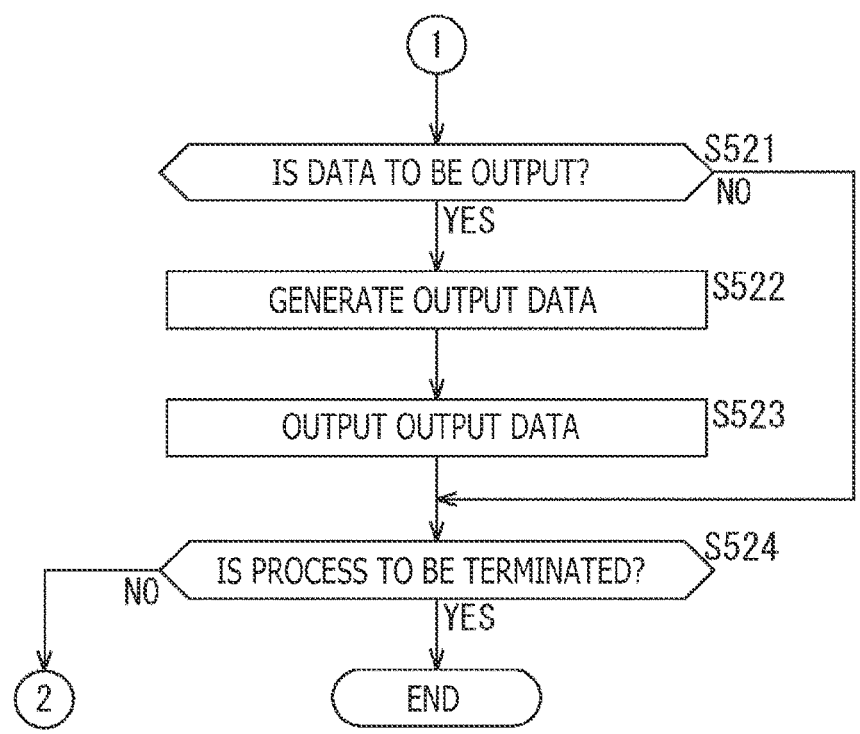
FIG. 22 is a flowchart explaining the exemplary flow of the lens emulation process continuously from FIG. 21.

Explained next with reference to the flowcharts in FIGS. 21 and 22 is an exemplary flow of the lens emulation process carried out by the computer 500 described above executing the application program.

When the lens emulation process is started, the GUI processing section 533 causes the monitor to display a GUI (development screen 100) in step S501 in FIG. 21, thereby starting to accept input.

In step S502 the input/output setting section 541 makes input/output settings in reference to the information input to the input section 511 and the like through the input/output setting section 111 on the development screen 100, for example.

In step S503, the depth estimation section 542 generates depth data by carrying out depth estimation based on the result of the input/output settings made in step S502 as well as on the information input to the input section 511 through the depth estimation section 112 on the development screen 100, for example.

In step S504, the GUI processing section 533 determines whether or not any lens icon 181 is selected in the lens selection section. 121 on the development screen 100, for example. In the case where any lens icon 181 is determined to be selected, control is transferred to step S505.

In step S505, the ray interpolation section 543 performs ray interpolation by using the result of the input/output settings made in step S502, the depth data generated in step S503, and the parameters of the lens corresponding to the lens icon 181 selected in step S504, for example. Upon completion of the process in step S505, control is transferred to step S507.

Alternatively, in the case where no lens icon 181 is determined to be selected in step S504, control is transferred to step S506. In step S506, the GUI processing section 533 determines whether or not any parameter is changed in the lens setting section 122 on the development screen 100, for example. In the case where any parameter is determined to be changed, control is transferred to step S507.

In step S507, the aberration table generation section 544 generates an aberration table by using the set parameters (parameters of the selected lens, or customized parameters).

In step S508, the light focusing processing section 545 performs the light focusing process by using the aberration table generated in step S507, and generates the virtual captured image taken through the selected lens.

In step S509, the image generation section 534 generates the display image by using the virtual captured image. In step S510, the image generation section. 534 causes the monitor of the output section 512 to display the display image. Upon completion of the process in step S510, control is transferred to the steps in FIG. 22.

Alternatively, in the case where it is determined in step S506 that no parameter is changed, control is transferred to the steps in FIG. 22.

In step S521 in FIG. 22, the output file generation section 535 determines whether or not to output the data. In the case where it is determined that the data is to be output, control is transferred to step S522. In step 3522, the output file generation section 535 generates the output data. In step S523, the output file generation section 535 outputs the output data. For example, the output file generation section 535 can store the generated output data into the storage section. 513, cause the communication section 514 to transmit the output data to another apparatus, or cause the drive 515 to record the output data to the removable recording medium 521. Upon completion of the process in step S523, control is transferred to step S524. Alternatively, in the case where it is determined in step S521 that the data is not to be output, control is transferred to step S524.

In step S524, the GUI processing section 533 determines whether or not to terminate the lens emulation process. In the case where it is determined that the lens emulation process is not to be terminated, control is returned to step S502 in FIG. 21, and the subsequent steps are repeated. In the case where it is determined in step S524 of FIG. 22 that the lens emulation process is to be terminated, the lens emulation process is brought to an end.

When the processes are carried out as described above, the user or the like can perform lens emulation more easily.

<Flow of the Other-Image Combination Process>

Explained next with reference to the flowchart in FIG. 23 is an exemplary flow of the other-image combination process implemented by the computer 500 described above executing the application program. When the other-image combination process is started, the processes of steps S551 through S554 are carried out in a manner similar to the processes of steps S501 through S503 and step S505 in the lens emulation process (FIG. 20).

In step S555, the other-image combination processing section 532 sets the position of the combination target image. In step S556, the other-image combination processing section. 532 generates a composite image by combining the combination target image with the virtual captured image. In step S557, the image generation section 534 generates the display image by using the composite image and causes the monitor of the output section 512 to display the generated display image.

Also, the processes of steps S558 through S561 are performed on the composite image in a manner similar to the processes of steps S521 through S524 in FIG. 22. In the case where it is determined in step S561 that the other-image combination process is to be terminated, the other-image combination process is brought to an end.

When the processes are carried out as described above, the user or the like can perform image combination more easily.

3. ADDITIONAL NOTES

<Hardware>

The series of the processes explained above can be executed either by software (application program) or by hardware.

<Applicable Targets for the Present Technology>

The present technology is applicable to desired configurations. For example, the present technology may be implemented as part of such an apparatus as the processor is the for of system LSI (Large Scale Integration) and the like, a module that uses multiple processors and the like, a unit that uses multiple modules and the like, or a unit set supplemented with other functions.

The present technology may, for example, also be applied to a network system including multiple apparatuses. For example, the present technology may be implemented as a cloud computing setup in which processes are carried out on a shared basis by multiple apparatuses via a network. For instance, the present technology may be implemented is a cloud service setup that offers services to desired terminals such as computers, mobile information processing terminals, or IoT (Internet of Things) devices.

Incidentally in the present description, the term. "system" refers to an aggregate of multiple components (e.g., apparatuses or modules (parts)). It does not matter whether all components are housed in the same enclosure. Thus, a system may be configured with multiple apparatuses housed in separate enclosures and interconnected via a network, or with a single apparatus in a single enclosure that houses multiple modules.

<Applicable Fields and Uses for the Present Technology>

The systems, the apparatuses, the processing sections, and the like to which the present technology is applied can be used for any desired purposes in any types of fields such as transportation, healthcare, crime prevention, agriculture, livestock farming, mining, beauty care, factories, home electric appliances, climate, and nature monitoring, for example.

OTHERS

The present technology is not limited to the embodiment discussed above and may be implemented in diverse variations so tar as they are within the scope of the present technology.

For example, any configuration explained in the foregoing paragraphs as one apparatus (or processing section) may be divided into multiple apparatuses (or processing sections). Conversely, the configurations explained above as multiple apparatuses (or processing sections) may be unified into one apparatus (or processing section). Also, the configuration of each apparatus (or processing section) may obviously be supplemented with a configuration or configurations other than those discussed above. Further, part of the configuration of an apparatus (or processing section) may be included in the configuration of another apparatus (or processing section), provided the configurations and the workings remain substantial the same for the system as a whole.

Further, the above-described programs, for example, may be carried out by any apparatus in such a case, the apparatus need only be arranged to possess necessary functions (e.g., functional blocks) and obtain necessary information.

Also, each of the steps in one flowchart may be executed either by a single apparatus or by multiple apparatuses on a shared basis, for example. Further, in the case where a single step includes multiple processes, these processes may be executed either by a single apparatus or by multiple apparatuses on a shared basis. In other words, multiple processes included in a single step may be executed as a process of multiple steps. Conversely, the process explained as including multiple steps may be executed as a single step.

The program including the processes of the steps for execution by the computer may be carried out in such a manner that the processes of the steps describing the program are executed chronologically, i.e., in the sequence explained in this description, in parallel with other programs, or in an otherwise appropriately timed fashion such as when the program is invoked as needed, for example. That is, the above processes of the steps may be carried out in sequences different from those discussed above as long as there is no conflict between the steps. Further, the processes of the steps describing the program may be performed in parallel with, or in combination with, the processes of other programs.

In addition, the multiple techniques related to the present technology may each be implemented independently of the others as long as there is no inconsistency therebetween, for example. Obviously, any number of these techniques may be implemented in combination. For example, some or all of the techniques discussed in conjunction with one embodiment may be implemented in combination with some or all of the techniques explained in connection with another embodiment. Further, some or all of any of the techniques discussed above may be implemented in combination with another technique not described above.

It is to be noted that the present disclosure can also be implemented in the following configurations.

(1) An image processing apparatus including: an aberration table generation section configured to generate an aberration table as a table including converging ray vectors derived from aberrations of a lens selected through a user interface and targeted for emulation; and a light focusing processing section configured to perform a light focusing process to Generate a virtual captured image taken of an object through the selected lens, by use of the aberration table and a multi-view image.

(2) The image processing apparatus as stated in paragraph (1) above, further including:

a display control section configured to display the user interface on a display section, in which the user interface includes icons each corresponding to lenses as a candidate targeted for emulation, and the aberration table generation section generates the aberration table by use of a lens parameter corresponding to a corresponding one of the icons selected through the user interface.

(3) The image processing apparatus as stated in paragraph (2) above, in which the user interface includes, as the icon, an icon corresponding to a lens of which the lens parameter has been set beforehand.

(4) The image processing apparatus as stated in paragraph (2) above, in which the user interface includes, as the icon, an icon corresponding to a lens of which the lens parameter has been set by a user.

(5) The image processing apparatus as stated in paragraph (2) above, in which the user interface further includes the virtual captured image Generated by the light focusing process.

(6) The image processing apparatus as stated in paragraph (5) above, in which the light focusing processing section performs the light focusing process in response to a drag-and-drop operation of the selected icon through the user interface, in such a manner as to generate the virtual captured image of which a position into which the icon has been dropped is focused on.

(7) The image processing apparatus as stated in paragraph (5) above, in which the light focusing processing section performs the light focusing process by use of the multi-view image reduced in resolution, in such a manner as to Generate the virtual captured image with a resolution lower than that of the multi-view image yet to be reduced in resolution, and the user interface further includes the virtual captured image that is generated by the light focusing process and that has the resolution lower: than that of the multi-view image yet to be reduced in resolution.

(8) The image processing apparatus as stated in paragraph (7) above, further including:

a storage control section configured to store onto a storage medium the virtual captured image with a resolution higher than that when the virtual captured image is displayed as the user interface.

(9) The image processing apparatus as stated in paragraph above, in which the user interface includes a user interface for updating the lens parameter corresponding to the selected icon, and the aberration table generation section generates the aberration table by use of the lens parameters updated through the user interface.

(10) The image processing apparatus as stated in paragraph (2) above, in which the user interface includes the virtual captured image representing a result of the light focusing process and having a point light source as the object thereof.

(11) The image processing apparatus as stated in paragraph (2) above, in which the user interface includes at least either a user interface for making settings related to apertures or a user interface for making settings related to a focus position.

(12) The image processing apparatus as stated in paragraph (2) above, in which the user interface includes a user interface for making settings related to aberrations.

(13) The image processing apparatus as stated in paragraph (1) above, further including:

a ray interpolation section configured to perform ray interpolation after selection of a lens targeted for emulation.

(14) The image processing apparatus as stated in paragraph (13) above, further including:

a depth estimation section configured to perform depth estimation before the ray interpolation is carried out.

(15) The image processing apparatus as stated in paragraph (14) above, in which the user interface includes a user interface for making settings related to the depth estimation, and the depth estimation section performs the depth estimation according to the settings made through the user interface in regard to the depth estimation.

(16) The image processing apparatus as stated in paragraph (14) above, further including:

an input/output setting section configured to make input/output settings before the depth estimation is carried out.

(17) The image processing apparatus as stated in paragraph (16) above, in which the user interface includes a user interface for inputting information regarding the input/output settings, and the input/output setting section makes the input/output settings in reference to the information input through the user interface in regard to the input/output settings.

(18) The image processing apparatus as stated in paragraph (1) above, further including:

an other-image combination processing section configured to combine the virtual captured image with a combination target image.

(19) An image processing method including:

generating an aberration table as a table including converging ray vectors derived from aberrations of a lens selected through a user interface and targeted for emulation; and performing a light focusing process to generate a virtual captured image taken of an object through the selected lens, by use of the aberration table and a multi-view image.

(20) A program for causing a computer to function as:
an aberration table generation section configured to generate an aberration table as a table including converging ray vectors derived from aberrations of a lens selected through a user interface and targeted for emulation; and
a light focusing processing section configured to perform a light focusing process to generate a virtual captured image taken of an object through the selected lens, by use of the aberration table and a multi-view image.

REFERENCE SIGNS LIST

10: Camera
100: Development screen
101: Tab display section.
102: GUI display section
110: Captured image display section
111: Input/output setting section.
112: Depth estimation section
113: Lens emulation section
121: Lens selection section
122: Lens setting section
171: Lens icon display section
172: Add button
173: Delete button
174: Process result saving section
181: Lens icon
310: Composite image display section
311: Input/output setting section
313: Lens emulation section
321: Lens selection section
322: Lens setting section
500: Computer
531: Emulation processing section.
532: Other-image combination processing section
533: GUI processing section
534: Image generation section
535: Output file generation section
541: Input setting section.
542: Depth estimation section
543: Ray interpolation section
544: Aberration table generation section
545: Light focusing processing section

The invention claimed is:

1. An image processing apparatus comprising:
a memory storing program code, and
a processor configured to execute the program code to perform operations comprising: generating an aberration table as a table including converging ray vectors derived from aberrations of a lens selected through a user interface and targeted for emulation;
performing alight focusing process to generate a virtual captured image taken of an object through the selected lens, by use of the aberration table and a multi-view image; and displaying the user interface on a display, wherein
the user interface includes icons each corresponding to lenses as a candidate targeted for emulation,
generating the aberration table uses a lens parameter corresponding to a corresponding one of the icons selected through the user interface, and
performing the light focusing process is responsive to a drag-and-drop operation of the selected icon through the user interface, in such a manner as to generate the virtual captured image with focus upon a position into which the icon has been dropped.

2. The image processing apparatus according to claim 1, wherein the selected icon corresponds to a lens of which the lens parameter has been set beforehand.

3. The image processing apparatus according to claim 1, wherein the selected icon corresponds to a lens of which the lens parameter has been set by a user.

4. The image processing apparatus according to claim 1, wherein the user interface further includes the virtual captured image generated by the light focusing process.

5. The image processing apparatus according to claim 4, wherein performing the light focusing process uses the multi-view image reduced in resolution, in such a manner as to generate the virtual captured image with a resolution lower than that of the multi-view image yet to be reduced in resolution, and
the user interface further includes the virtual captured image that is generated by the light focusing process and that has the resolution lower than that of the multi-view image yet to be reduced in resolution.

6. The image processing apparatus according to claim 5, wherein the operations further comprise: storing onto a storage medium the virtual captured image with a resolution higher than that when the virtual captured image is displayed as the user interface.

7. The image processing apparatus according to claim 1, wherein the user interface includes a user interface for updating the lens parameter corresponding to the selected icon, and
generating the aberration table by use of the lens parameters updated through the user interface.

8. The image processing apparatus according to claim 1, wherein the user interface includes at least either a user interface for making settings related to apertures or a user interface for making settings related to focus position.

9. The image processing apparatus according to claim 1, wherein the user interface includes a user interface for making settings related to aberrations.

10. The image processing apparatus according to claim 1, wherein the operations further comprise:
performing ray interpolation after selection of a lens targeted for emulation.

11. The image processing apparatus according to claim 10, wherein the operations further comprise:
performing depth estimation before the ray interpolation is carried out.

12. The image processing apparatus according to claim 11, wherein the user interface includes a user interface for making settings related to the depth estimation, and performing the depth estimation is according to the settings made through the user interface in regard to the depth estimation.

13. The image processing apparatus according to claim 11, wherein the operations further comprising:
making input/output settings before the depth estimation is carried out.

14. The image processing apparatus according to claim 13, wherein the user interface includes a user interface for inputting information regarding the input/output settings, and
making the input/output settings is in reference to the information input through the user interface in regard to the input/output settings.

15. The image processing apparatus according to claim 1, wherein the operations further comprising:

combining the virtual captured image with a combination target image.

16. An image processing apparatus comprising:
a memory storing program code, and
a processor configured to execute the program code to perform operations comprising:
generating an aberration table as a table including converging ray vectors derived from aberrations of a lens selected through a user interface and targeted for emulation:
performing alight focusing process to generate a virtual captured image taken of an object through the selected lens, by use of the aberration table and a multi-view image; and
displaying the user interface on a display, wherein
the user interface includes icons each corresponding to lenses as a candidate targeted for emulation,
generating the aberration table uses a lens parameter corresponding to a corresponding one of the icons selected through the user interface, and
the user interface includes the virtual captured image representing a result of the light focusing process and having a point light source as the object thereof.

17. A non-transitory computer readable medium storing a program, the program being executable by a computer to perform operations comprising:
generating an aberration table as a table including converging ray vectors derived from aberrations of a lens selected through a user interface and targeted for emulation;
performing alight focusing process to generate a virtual captured image taken of an object through the selected lens, by use of the aberration table and a multi-view image; and
displaying the user interface on a display, wherein
the user interface includes icons each corresponding to lenses as a candidate targeted for emulation,
generating the aberration table uses a lens parameter corresponding to a corresponding one of the icons selected through the user interface, and
performing the light focusing process is responsive to a drag-and-drop operation of the selected icon through the user interface, in such a manner as to generate the virtual captured image with focus upon a position into which the icon has been dropped.

18. A non-transitory computer readable medium storing a program, the program being executable to perform operations comprising:
generating an aberration table as a table including converging ray vectors derived from aberrations of a lens selected through a user interface and targeted for emulation;
performing alight focusing process to generate a virtual captured image taken of an object through the selected lens, by use of the aberration table and a multi-view image; and
displaying the user interface on a display, wherein the user interface includes icons each corresponding to lenses as a candidate targeted for emulation,
generating the aberration table uses a lens parameter corresponding to a corresponding one of the icons selected through the user interface, and
the user interface includes the virtual captured image representing a result of the light focusing process and having a point light source as the object thereof.

* * * * *